US010250958B2

(12) United States Patent
Chen et al.

(10) Patent No.: US 10,250,958 B2
(45) Date of Patent: Apr. 2, 2019

(54) OPTICAL NETWORK-ON-CHIP, OPTICAL ROUTER, AND SIGNAL TRANSMISSION METHOD

(71) Applicant: Huawei Technologies Co., Ltd., Shenzhen (CN)

(72) Inventors: Ke Chen, Xi'an (CN); Xiuhua Li, Xi'an (CN); Huaxi Gu, Xi'an (CN); Liang Song, Hangzhou (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 141 days.

(21) Appl. No.: 15/625,025

(22) Filed: Jun. 16, 2017

(65) Prior Publication Data

US 2017/0289655 A1  Oct. 5, 2017

Related U.S. Application Data

(63) Continuation of application No. PCT/CN2015/096573, filed on Dec. 7, 2015.

(30) Foreign Application Priority Data

Dec. 18, 2014  (CN) .......................... 2014 1 0796168

(51) Int. Cl.
*H04B 10/00* (2013.01)
*H04Q 11/00* (2006.01)
(Continued)

(52) U.S. Cl.
CPC ..... *H04Q 11/0066* (2013.01); *G02B 6/12004* (2013.01); *G02B 6/12007* (2013.01);
(Continued)

(58) Field of Classification Search
USPC ...................................................... 398/45–49
See application file for complete search history.

(56) References Cited

U.S. PATENT DOCUMENTS 7,720,377 B2 * 5/2010 Snider .................... B82Y 10/00
                                                                  370/352
8,260,147 B2 * 9/2012 Scandurra ............ H04B 10/803
                                                                  398/138
(Continued)

FOREIGN PATENT DOCUMENTS

CN          101872039 A      10/2010
CN          101917333 A      12/2010
(Continued)

OTHER PUBLICATIONS

Chen, K., et al., "TWC-based Approach for Improving Communication Reliability in Optical Network-on-chip", IEEE International Conference of IEEE Region 10 (TENCON 2013), IEEE, Oct. 22, 2013.pp. 1-4.

(Continued)

*Primary Examiner* — Agustin Bello
(74) *Attorney, Agent, or Firm* — Slater Matsil, LLP

(57) ABSTRACT

An optical network-on-chip, an optical router, and a signal transmission method. The optical network-on-chip includes: N2 intellectual property IP cores, N2/2 gateways, and N2 optical routers. The N2 optical routers form two subnets, and every N2/2 optical routers form one subnet. Each gateway in the N2/2 gateways is connected to every two IP cores in the N2 IP cores, where IP cores connected to different gateways are different, and the two IP cores connected to each gateway are in one-to-one correspondences with the two subnets. The N2/2 gateways are in one-to-one correspondences with the N2/2 optical routers in each subnet in the two subnets, where each gateway is connected to an optical router that is in each subnet and that is corresponding to each gateway.

19 Claims, 18 Drawing Sheets

(51) Int. Cl.
*G02B 6/12* (2006.01)
*G02B 6/293* (2006.01)
*H04B 10/27* (2013.01)
*H04L 12/24* (2006.01)
*H04L 12/933* (2013.01)

(52) U.S. Cl.
CPC ......... *G02B 6/29338* (2013.01); *H04B 10/27* (2013.01); *H04L 41/0893* (2013.01); *H04L 49/109* (2013.01); *H04Q 11/0005* (2013.01); *H04Q 2011/0039* (2013.01); *H04Q 2011/0054* (2013.01); *H04Q 2011/0092* (2013.01)

(56) References Cited

U.S. PATENT DOCUMENTS

| | | | | |
|---|---|---|---|---|
| 8,406,623 | B2* | 3/2013 | Koka | H04Q 11/0062 398/45 |
| 8,472,808 | B2* | 6/2013 | Roberts | G02B 6/43 398/141 |
| 8,606,113 | B2* | 12/2013 | Koka | H04B 10/801 398/164 |
| 9,479,256 | B2* | 10/2016 | Thonnart | G02B 6/43 |
| 9,551,836 | B2* | 1/2017 | Frankel | H04B 10/271 |
| 10,117,007 | B2* | 10/2018 | Song | H04Q 11/0003 |
| 2009/0274413 | A1* | 11/2009 | Beausoleil | H04B 10/801 385/14 |
| 2010/0278532 | A1* | 11/2010 | Scandurra | H04B 10/803 398/45 |
| 2011/0069963 | A1* | 3/2011 | McLaren | G02B 6/12007 398/115 |
| 2013/0294458 | A1 | 11/2013 | Yamaguchi et al. | |
| 2014/0328208 | A1 | 11/2014 | Norige et al. | |
| 2015/0139646 | A1* | 5/2015 | Thonnart | G02B 6/43 398/58 |
| 2015/0163570 | A1* | 6/2015 | Zid | H04Q 11/0005 398/45 |
| 2017/0005735 | A1* | 1/2017 | Li | H04J 14/0227 |
| 2017/0127161 | A1* | 5/2017 | Song | H04Q 11/0003 |
| 2017/0289655 | A1* | 10/2017 | Chen | G02B 6/12004 |
| 2018/0225156 | A1 | 8/2018 | Lu et al. | |

FOREIGN PATENT DOCUMENTS

| | | |
|---|---|---|
| CN | 10091784 A | 5/2013 |
| JP | H02143638 A | 6/1990 |
| KR | 101465420 B1 | 11/2014 |
| WO | 2008067597 A1 | 6/2008 |
| WO | 2013054497 A1 | 4/2013 |
| WO | 2014183530 A1 | 11/2014 |

OTHER PUBLICATIONS

Li, X., et al., "A New Optical Network-on-Chip Architecture for Chip Multiprocessor", Asia Communications and Photonics Conference (ACP), 2015 OSA, Jan. 1, 2015, 4 pages.

Tan, X., et al., "A Hybrid Optoelectronic Networks-on-Chip Architecture", Journal of Lightwave Technology, vol. 32, No. 5, Mar. 1, 2014, 8 pages.

Wang, Z., et al., "Ring Based Optical Network-on-Chip", Optics Communications, Elsevier, Amsterdam, NL, vol. 285, No. 6, Oct. 14, 2011, pp. 584-596.

Ye, Y., et al., "3-D Mesh-Based Optical Network-on-Chip for Multiprocessor System-on-Chip", IEEE Transactions on Computer-Aided Design of Intergrated Circuits and Systems, vol. 32, No. 4, Apr. 2013, 14 pages.

Ye, Y. et al., "3-D Mesh-Based Optical Network-on-Chip for Multiprocessor System-on-Chip," IEEE Transactions on Computer-Aided Design of Integrated Circuits and Systems, vol. 32, No. 4, Apr. 2013, pp. 584-596.

* cited by examiner

OPTICAL NETWORK-ON-CHIP, OPTICAL ROUTER, AND SIGNAL TRANSMISSION METHOD

CROSS-REFERENCE TO RELATED APPLICATIONS

This application is a continuation of International Application No. PCT/CN2015/096573, filed on Dec. 07, 2015, which claims priority to Chinese Patent Application No. 201410796168.8, filed on Dec. 18, 2014. The disclosures of the aforementioned applications are hereby incorporated by reference in their entireties.

TECHNICAL FIELD

The present disclosure relates to the field of information technologies, and more specifically, to an optical network-on-chip, an optical router, and a signal transmission method.

BACKGROUND

In future design of a multi-core processor, because of standstill of a solution for performance and power consumption, on-chip electrical interconnection becomes a bottleneck impeding system development. As silicon-based optoelectronic technologies become mature, optical communication becomes a most promising solution for interconnection of on-chip cores. However, because optical storage cannot be effectively integrated, and an optical logical processing technology is still not mature, communication resources need to be pre-allocated. In an optical network-on-chip (ONoC), an optical circuit exchange mechanism is usually used to implement communication between intellectual property (IP) cores. Before sending data to a destination node (a destination IP core), a source node (a source IP core) needs to reserve a communication resource, and a reserved communication resource is exclusively used by the data sent by the source node to the destination node, that is, another communications node cannot share the resource. Therefore, link utilization of optical circuit exchange is relatively low, and network congestion is relatively severe.

Currently, in an optical network-on-chip in which the optical circuit exchange mechanism is used, Mesh and Torus topologies are widely used. Network diameters (that is, maximum transmission hop counts) of optical networks-on-chip of an N×N scale implemented based on the Mesh and Torus topologies are respectively 2N−2 and N, and in addition, average hop counts of the two networks rapidly increase with expansion of a network scale, and consequently, severe congestion occurs in a process of resource reservation, and further network performance is affected.

SUMMARY

Embodiments of the present disclosure provide an optical network-on-chip, an optical router, and a signal transmission method, such that network performance can be improved.

According to a first aspect, an optical network-on-chip is provided, including: N2 intellectual property IP cores, N2/2 gateways, and N2 optical routers, where: N is an even number. The N2 optical routers form two subnets, and every N2/2 optical routers form one subnet. Each gateway in the N2/2 gateways is connected to every two IP cores in the N2 IP cores, where IP cores connected to different gateways are different, and the two IP cores connected to each gateway are in one-to-one correspondences with the two subnets. The N2/2 gateways are in one-to-one correspondences with the N2/2 optical routers in each subnet in the two subnets, where each gateway is connected to an optical router that is in each subnet and that is corresponding to each gateway. A first IP core in the N2 IP cores is configured to send a first signal to a gateway connected to the first IP core. The gateway connected to the first IP core is configured to: determine a second IP core according to the first signal, where the second IP core is a destination IP core of the first signal; and determine a subnet corresponding to the second IP core, and send the first signal to a first optical router in the subnet corresponding to the second IP core, where the first optical router is an optical router connected to the gateway that is connected to the first IP core. The subnet corresponding to the second IP core is configured to: receive the first signal using the first optical router, and route the first signal to a second optical router in the subnet corresponding to the second IP core, where the second optical router is an optical router connected to a gateway that is connected to the second IP core; and send, using the second optical router, the first signal to the gateway connected to the second IP core. The gateway connected to the second IP core is configured to send the first signal to the second IP core.

With reference to the first aspect, in a first possible implementation manner, the gateway connected to the first IP core is configured to determine, according to a correspondence between an IP core and a subnet, the subnet corresponding to the second IP core; and the gateway connected to the second IP core is configured to send the first signal to the second IP core according to the correspondence between an IP core and a subnet.

With reference to the first aspect or the first possible implementation manner of the first aspect, in a second possible implementation manner, the N2 optical routers form the two subnets in the following manner: arranging the N2 optical routers into N rows and N columns, where optical routers located in odd-numbered rows and odd-numbered columns and optical routers located in even-numbered rows and even-numbered columns belong to one subnet, and optical routers located in odd-numbered rows and even-numbered columns and optical routers located in even-numbered rows and odd-numbered columns belong to the other subnet; and in each subnet, each optical router stretches out a pair of parallel waveguides respectively in four directions of upper left, lower left, upper right, and lower right, where the pair of parallel waveguides are connected to waveguides stretched out by another optical router, and if the waveguides arrive at an included angle between subnet edges, the waveguides continue extending in an opposite direction, or if the waveguides arrive at a subnet edge, the waveguides continue extending in a direction perpendicular to the edge.

With reference to the second possible implementation manner of the first aspect, in a third possible implementation manner, N2/2 optical routers in a same subnet in the two subnets have same Z coordinates, and optical routers in different subnets have different Z coordinates; X and Y coordinates of each optical router in each subnet are allocated in the following manner: transforming each subnet to a Torus structure of N rows and N/2 columns, where optical routers in each column are in a longitudinal torus, and optical routers in an $i^{th}$ row and an $(i+N/2)^{th}$ row are in a transverse torus, where $i=1,2,\ldots,N/2$; and successively allocating X and Y coordinates to each optical router in each subnet using an optical router located in an upper left corner as an origin of coordinates, a horizontally rightward direction as an X positive direction, and a vertically downward direction as a Y positive direction, and returning to the original structure according to an inverse process, so as to complete allocation of the coordinates; each IP core in the two IP cores connected to each gateway and the optical router that is connected to each gateway and that is in the subnet corresponding to each IP core have same X, Y, and Z coordinates; the gateway connected to the first IP core is configured to determine, according to Z coordinates of the second IP core, the subnet corresponding to the second IP core; and each optical router in each subnet uses the following routing algorithm:

obtaining current node coordinates (Xc,Yc), and destination node coordinates (Xd,Yd);

if Yc=Yd and Xc=Xd, an output direction is local;

if Yc=Yd and Xc<Xd, an output direction is east;

if Yc=Yd and Xc≥Xd, an output direction is west;

if Yc≠Yd, |Yc−Yd|=N/2, and Xc<Xd, an output direction is west;

if Yc≠Yd, |Yc−Yd|=N/2, and Yc≥Yd, an output direction is east;

if Yc≠Yd, |Yc−Yd|≠N/2, and (Yt−Yc+N)% N>N/2, an output direction is north; or if Yc≠Yd, |Xc−Yd|≠N/2, and (Yt−Yc+N)% N≤N/2, an output direction is south, where (Xt,Yt) is determined in the following manner:

if Yd<N/2, letting (Xt1,Yt1)=(Xc,Yd), and (Xt2,Yt2)=(Xc,Yd+N/2);

otherwise, letting (Xt1,Yt1)=(Xc,Yd), and (Xt2,Yt2)=(Xc,Yd|N/2); and calculating Mint1=min(|Yt1|Yc|,N|Yt1−Yc|), and Mint2=min(|Yt2|Yc|,N|Yt2−Yc|);

if Mint1<Mint2, (Xt,Yt)=(Xt1,Tt1); otherwise, (Xt,Yt)=(Xt2,Yt2).

With reference to any one of the first aspect, or the first to the third possible implementation manners of the first aspect, in a fourth possible implementation manner, each optical router in each subnet includes: a first microring resonator, a second microring resonator, a third microring resonator, a fourth microring resonator, a fifth microring resonator, a sixth microring resonator, a seventh microring resonator, an eighth microring resonator, a ninth microring resonator, a tenth microring resonator, an eleventh microring resonator, and a twelfth microring resonator; a first waveguide, a second waveguide, a third waveguide, a fourth waveguide, a fifth waveguide, and a sixth waveguide. One end of the first waveguide is a northern input end, and the other end is a southern output end. One end of the second waveguide is a southern input end, and the other end is a northern output end. One end of the third waveguide is a western input end, and the other end is an eastern output end. One end of the fourth waveguide is an eastern input end, and the other end is a western output end. One end of the fifth waveguide is a local input end. One end of the sixth waveguide is a local output end. A signal that is input at the northern input end arrives at the local output end through the first waveguide, the first microring resonator, and the sixth waveguide. A signal that is input at the southern input end arrives at the local output end through the second waveguide, the fourth microring resonator, and the sixth waveguide. A signal that is input at the western input end arrives at the local output end through the third waveguide, the third microring resonator, and the sixth waveguide. A signal that is input at the eastern input end arrives at the local output end through the fourth waveguide, the second microring resonator, and the sixth waveguide. A signal that is input at the local input end arrives at the eastern output end through the fifth waveguide, the eighth microring resonator, and the third waveguide. The signal that is input at the local input end arrives at the western output end through the fifth waveguide, the fifth microring resonator, and the fourth waveguide. The signal that is input at the local input end arrives at the southern output end through the fifth waveguide, the sixth microring resonator, and the first waveguide. The signal that is input at the local input end arrives at the northern output end through the fifth waveguide, the seventh microring resonator, and the second waveguide. The signal that is input at the northern input end arrives at the western output end through the first waveguide, the ninth microring resonator, and the fourth waveguide. The signal that is input at the northern input end arrives at the eastern output end through the first waveguide, the tenth microring resonator, and the third waveguide. The signal that is input at the southern input end arrives at the western output end through the second waveguide, the twelfth microring resonator, and the fourth waveguide. The signal that is input at the southern input end arrives at the eastern output end through the second waveguide, the eleventh microring resonator, and the third waveguide.

With reference to the second possible implementation manner of the first aspect, in a fifth possible implementation manner, N2/2 optical routers in a same subnet in the two subnets have same Z coordinates, and optical routers in different subnets have different Z coordinates; X and Y coordinates of each optical router in each subnet are allocated in the following manner: transforming each subnet to a Torus structure of N/2 rows and N columns, where optical routers in each row are in a transverse torus, and optical routers in a $j^t$ column and a $(j+N/2)^{th}$ column are in a longitudinal torus, where j=1,2, . . . , N/2; and successively allocating X and Y coordinates to each optical router in each subnet using an optical router located in an upper left corner as an origin of coordinates, a horizontally rightward direction as an X positive direction, and a vertically downward direction as a Y positive direction, and returning to the original structure according to an inverse process, so as to complete allocation of the coordinates; each IP core in the two IP cores connected to each gateway and the optical router that is connected to each gateway and that is in the subnet corresponding to each IP core have same X, Y, and Z coordinates; the gateway connected to the first IP core is configured to determine, according to Z coordinates of the second IP core, the subnet corresponding to the second IP core; and each optical router in each subnet uses the following routing algorithm:

obtaining current node coordinates (Xc,Yc), and destination node coordinates (Xd,Yd);

if Xc=Xd and Yc=Yd, an output direction is local;

if Xc=Xd and Yc<Yd, an output direction is south;

if Xc=Xd and Yc≥Yd, an output direction is north;

if Xc≠Xd, |Xc−Xd|=N/2, and Yc<Yd, an output direction is north;

if Xc≠Xd, |Xc−Xd|=N/2, and Yc≥Yd, an output direction is south;

if Xc≠Xd, |Xc−Xd|≠N/2, and (Xt−Xc+N)% N>N/2, an output direction is west; or if Xc≠Xd, |Xc−Xd|≠N/2, and (Xt−Xc+N)% N≤N/2, an output direction is east, where (Xt,Yt) is determined in the following manner:

if Xd<N/2, letting (Xt1,Yt1)=(Xd,Yc), and (Xt2,Yt2)=(Xd+N/2,Yc);

otherwise, letting (Xt1,Yt1)=(Xd,Yc), and (Xt2,Yt2)=(Xd−N/2,Yc); and calculating Mint1=min(|Xt1−Xc|,N−|Xt1−Xc|), and Mint2=min(|Xt2|Xc|,N−|Xt2−Xc|);

if Mint1<Mint2, (Xt,Yt)=(Xt1,Tt1); otherwise, (Xt,Yt)=(Xt2,Yt2).

With reference to the first aspect or the first possible implementation manner of the first aspect, in a sixth possible implementation manner, each subnet is a Torus topology.

With reference to the sixth possible implementation manner of the first aspect, in a seventh possible implementation manner, each optical router in each subnet uses an XY routing algorithm or a YX routing algorithm.

With reference to any one of the first aspect, or the first, the second, the fifth to the seventh possible implementation manners of the first aspect, in an eighth possible implementation manner, each optical router in each subnet includes: a first microring resonator, a second microring resonator, a third microring resonator, a fourth microring resonator, a fifth microring resonator, a sixth microring resonator, a seventh microring resonator, and an eighth microring resonator; a first waveguide, a second waveguide, a third waveguide, a fourth waveguide, a fifth waveguide, and a sixth waveguide. One end of the first waveguide is a northern input end, and the other end is a southern output end; one end of the second waveguide is a southern input end, and the other end is a northern output end. One end of the third waveguide is a western input end, and the other end is an eastern output end. One end of the fourth waveguide is an eastern input end, and the other end is a western output end. One end of the fifth waveguide is a local input end. One end of the sixth waveguide is a local output end. A signal that is input at the northern input end arrives at the local output end through the first waveguide, the first microring resonator 801, and the sixth waveguide. A signal that is input at the southern input end arrives at the local output end through the second waveguide, the second microring resonator, and the sixth waveguide. A signal that is input at the western input end arrives at the local output end through the third waveguide, the eighth microring resonator, the first waveguide, the first microring resonator, and the sixth waveguide. A signal that is input at the eastern input end arrives at the local output end through the fourth waveguide, the fifth microring resonator, the second waveguide, the second microring resonator, and the sixth waveguide. A signal that is input at the local input end arrives at the eastern output end through the fifth waveguide, the fourth microring resonator, and the third waveguide. The signal that is input at the local input end arrives at the western output end through the fifth waveguide, the third microring resonator, and the fourth waveguide. The signal that is input at the local input end arrives at the southern output end through the fifth waveguide, the fourth microring resonator, the third waveguide, the eighth microring resonator, and the first waveguide. The signal that is input at the local input end arrives at the northern output end through the fifth waveguide, the third microring resonator, the fourth waveguide, the fifth microring resonator, and the second waveguide. The signal that is input at the eastern input end arrives at the northern output end through the fourth waveguide, the fifth microring resonator, and the second waveguide. The signal that is input at the eastern input end arrives at the southern output end through the fourth waveguide, the sixth microring resonator, and the first waveguide. The signal that is input at the western input end arrives at the northern output end through the third waveguide, the seventh microring resonator, and the second waveguide. The signal that is input at the western input end arrives at the southern output end through the third waveguide, the eighth microring resonator, and the first waveguide.

With reference to any one of the first aspect, or the first, the second, the fifth to the seventh possible implementation manners of the first aspect, in a ninth possible implementation manner, each optical router in each subnet is a Crux optical router.

According to a second aspect, an optical router is provided. The router includes a first microring resonator, a second microring resonator, a third microring resonator, a fourth microring resonator, a fifth microring resonator, a sixth microring resonator, a seventh microring resonator, and an eighth microring resonator. The router also includes a first waveguide, a second waveguide, a third waveguide, a fourth waveguide, a fifth waveguide, and a sixth waveguide. One end of the first waveguide is a northern input end, and the other end is a southern output end. One end of the second waveguide is a southern input end, and the other end is a northern output end. One end of the third waveguide is a western input end, and the other end is an eastern output end. One end of the fourth waveguide is an eastern input end, and the other end is a western output end. One end of the fifth waveguide is a local input end. One end of the sixth waveguide is a local output end. A signal that is input at the northern input end arrives at the local output end through the first waveguide, the first microring resonator, and the sixth waveguide. A signal that is input at the southern input end arrives at the local output end through the second waveguide, the second microring resonator, and the sixth waveguide. A signal that is input at the western input end arrives at the local output end through the third waveguide, the eighth microring resonator, the first waveguide, the first microring resonator, and the sixth waveguide. A signal that is input at the eastern input end arrives at the local output end through the fourth waveguide, the fifth microring resonator, the second waveguide, the second microring resonator, and the sixth waveguide. A signal that is input at the local input end arrives at the eastern output end through the fifth waveguide, the fourth microring resonator, and the third waveguide. The signal that is input at the local input end arrives at the western output end through the fifth waveguide, the third microring resonator, and the fourth waveguide. The signal that is input at the local input end arrives at the southern output end through the fifth waveguide, the fourth microring resonator, the third waveguide, the eighth microring resonator, and the first waveguide. The signal that is input at the local input end arrives at the northern output end through the fifth waveguide, the third microring resonator, the fourth waveguide, the fifth microring resonator, and the second waveguide. The signal that is input at the eastern input end arrives at the northern output end through the fourth waveguide, the fifth microring resonator, and the second waveguide. The signal that is input at the eastern input end arrives at the southern output end through the fourth waveguide, the sixth microring resonator, and the first waveguide. The signal that is input at the western input end arrives at the northern output end through the third waveguide, the seventh microring resonator, and the second waveguide. The signal that is input at the western input end arrives at the southern output end through the third waveguide, the eighth microring resonator, and the first waveguide.

According to a third aspect, an optical router is provided. The router includes a first microring resonator, a second microring resonator, a third microring resonator, a fourth microring resonator, a fifth microring resonator, a sixth microring resonator, a seventh microring resonator, an eighth microring resonator, a ninth microring resonator, a tenth microring resonator, an eleventh microring resonator, and a twelfth microring resonator. The router also includes a first waveguide, a second waveguide, a third waveguide, a fourth waveguide, a fifth waveguide, and a sixth waveguide. One end of the first waveguide is a northern input end, and the other end is a southern output end. One end of the second waveguide is a southern input end, and the other end is a northern output end. One end of the third waveguide is a western input end, and the other end is an eastern output end. One end of the fourth waveguide is an eastern input end and the other end is a western output end. One end of the fifth waveguide is a local input end. One end of the sixth waveguide is a local output end. A signal that is input at the northern input end arrives at the local output end through the first waveguide, the first microring resonator, and the sixth waveguide. A signal that is input at the southern input end arrives at the local output end through the second waveguide, the fourth microring resonator, and the sixth waveguide. A signal that is input at the western input end arrives at the local output end through the third waveguide, the third microring resonator, and the sixth waveguide. A signal that is input at the eastern input end arrives at the local output end through the fourth waveguide, the second microring resonator, and the sixth waveguide. A signal that is input at the local input end arrives at the eastern output end through the fifth waveguide, the eighth microring resonator, and the third waveguide. The signal that is input at the local input end arrives at the western output end through the fifth waveguide, the fifth microring resonator, and the fourth waveguide. The signal that is input at the local input end arrives at the southern output end through the fifth waveguide, the sixth microring resonator, and the first waveguide. The signal that is input at the local input end arrives at the northern output end through the fifth waveguide, the seventh microring resonator, and the second waveguide. The signal that is input at the northern input end arrives at the western output end through the first waveguide, the ninth microring resonator, and the fourth waveguide. The signal that is input at the northern input end arrives at the eastern output end through the first waveguide, the tenth microring resonator, and the third waveguide. The signal that is input at the southern input end arrives at the western output end through the second waveguide, the twelfth microring resonator, and the fourth waveguide. The signal that is input at the southern input end arrives at the eastern output end through the second waveguide, the eleventh microring resonator, and the third waveguide.

According to a fourth aspect, a signal transmission method in an optical network-on-chip is provided. The optical network-on-chip includes: N2 intellectual property IP cores, N2/2 gateways, and N2 optical routers, where N is an even number. The N2 optical routers form two subnets, and every N2/2 optical routers form one subnet. Each gateway in the N2/2 gateways is connected to every two IP cores in the N2 IP cores, where IP cores connected to different gateways are different, and the two IP cores connected to each gateway are in one-to-one correspondences with the two subnets. The N2/2 gateways are in one-to-one correspondences with the N2/2 optical routers in each subnet in the two subnets, where each gateway is connected to an optical router that is in each subnet and that is corresponding to each gateway. The method includes sending, by a first IP core in the N2 IP cores, a first signal to a gateway connected to the first IP core. The method also includes determining, by the gateway connected to the first IP core, a second IP core according to the first signal, where the second IP core is a destination IP core of the first signal; and determining a subnet corresponding to the second IP core, and sending the first signal to a first optical router in the subnet corresponding to the second IP core, where the first optical router is an optical router connected to the gateway that is connected to the first IP core. The method also includes receiving, by the subnet corresponding to the second IP core, the first signal using the first optical router, and routing the first signal to a second optical router in the subnet corresponding to the second IP core, where the second optical router is an optical router connected to a gateway that is connected to the second IP core. The method also includes sending, using the second optical router, the first signal to the gateway connected to the second IP core. The method also includes sending, by the gateway connected to the second IP core, the first signal to the second IP core.

With reference to the fourth aspect, in a first possible implementation manner, the determining a subnet corresponding to the second IP core includes: determining, according to a correspondence between an IP core and a subnet, the subnet corresponding to the second IP core; and sending, by the gateway connected to the second IP core, the first signal to the second IP core includes: sending, by the gateway connected to the second IP core, the first signal to the second IP core according to the correspondence between an IP core and a subnet.

With reference to the fourth aspect or the first possible implementation manner of the fourth aspect, in a second possible implementation manner, the N2 optical routers form the two subnets in the following manner: arranging the N2 optical routers into N rows and N columns, where optical routers located in odd-numbered rows and odd-numbered columns and optical routers located in even-numbered rows and even-numbered columns belong to one subnet, and optical routers located in odd-numbered rows and even-numbered columns and optical routers located in even-numbered rows and odd-numbered columns belong to the other subnet; and in each subnet, each optical router stretches out a pair of parallel waveguides respectively in four directions of upper left, lower left, upper right, and lower right, where the pair of parallel waveguides are connected to waveguides stretched out by another optical router, and if the waveguides arrive at an included angle between subnet edges, the waveguides continue extending in an opposite direction, or if the waveguides arrive at a subnet edge, the waveguides continue extending in a direction perpendicular to the edge.

With reference to the second possible implementation manner of the fourth aspect, in a third possible implementation manner, N2/2 optical routers in a same subnet in the two subnets have same Z coordinates, and optical routers in different subnets have different Z coordinates; X and Y coordinates of each optical router in each subnet are allocated in the following manner: transforming each subnet to a Torus structure of N/2 rows and N columns, where optical routers in each row are in a transverse torus, and optical routers in a $j^{th}$ column and a $(j+N/2)^{th}$ column are in a longitudinal torus, where $j=1, 2, \ldots, N/2$; and successively allocating X and Y coordinates to each optical router in each subnet using an optical router located in an upper left corner as an origin of coordinates, a horizontally rightward direction as an X positive direction, and a vertically downward direction as a Y positive direction, and returning to the original structure according to an inverse process, so as to complete allocation of the coordinates; each IP core in the two IP cores connected to each gateway and the optical router that is connected to each gateway and that is in the subnet corresponding to each IP core have same X, Y, and Z coordinates; the gateway connected to the first IP core determines, according to Z coordinates of the second IP core, the subnet corresponding to the second IP core; and each optical router in each subnet uses the following routing algorithm:

obtaining current node coordinates (Xc,Yc), and destination node coordinates (Xd,Yd);

if Xc=Xd and Yc=Yd, an output direction is local;

if Xc=Xd and Yc<Yd, an output direction is south;

if Xc=Xd and Yc≥Yd, an output direction is north;

if Xc≠Xd, |Xc−Xd−|=N/2, and Yc<Yd, an output direction is north;

if Xc≠Xd, |Xc−Xd−|=N/2, and Yc≥Yd, an output direction is south;

if Xc≠Xd, |Xc−Xd|≠N/2, and (Xt−Xc+N)% N>N/2, an output direction is west; or if Xc≠Xd, |Xc−Xd|≠N/2, and (Xt−Xc+N)% N≤N/2, an output direction is east, where (Xt,Yt) is determined in the following manner:

if Xd<N/2, letting (Xt1,Tt1)=(Xd,Yc), and (Xt2,Yt2)=(Xd+N/2,Yc); otherwise, letting (Xt1,Yt1)=(Xd,Yc), and (Xt2,Yt2)=(Xd−N/2,Yc); and calculating Mint1=min(|Xt1−Xc|,N−|Xt1−Xc|), and Mint2=min(|Xt2−Xc|,N−|Xt2−Xc|); if Mint1<Mint2, (Xt,Yt)=(Xt1,Yt1); otherwise, (Xt,Yt)=(Xt2,Yt2).

With reference to the fourth aspect or the first possible implementation manner of the fourth aspect, in a fourth possible implementation manner, each subnet is a Torus topology.

With reference to the fourth possible implementation manner of the fourth aspect, in a fifth possible implementation manner, each optical router in each subnet uses an XY routing algorithm or a YX routing algorithm.

With reference to the second possible implementation manner of the fourth aspect, in a sixth possible implementation manner, N2/2 optical routers in a same subnet in the two subnets have same Z coordinates, and optical routers in different subnets have different Z coordinates; X and Y coordinates of each optical router in each subnet are allocated in the following manner: transforming each subnet to a Torus structure of N rows and N/2 columns, where optical routers in each column are in a longitudinal torus, and optical routers in an $i^{th}$ row and an $(i+N/2)^{th}$ row are in a transverse torus, where i=1,2, . . . , N/2; and successively allocating X and Y coordinates to each optical router in each subnet using an optical router located in an upper left corner as an origin of coordinates, a horizontally rightward direction as an X positive direction, and a vertically downward direction as a Y positive direction, and returning to the original structure according to an inverse process, so as to complete allocation of the coordinates; each IP core in the two IP cores connected to each gateway and the optical router that is connected to each gateway and that is in the subnet corresponding to each IP core have same X, Y, and Z coordinates; the gateway connected to the first IP core determines, according to Z coordinates of the second IP core, the subnet corresponding to the second IP core; and each optical router in each subnet uses the following routing algorithm:

obtaining current node coordinates (Xc,Yc), and destination node coordinates (Xd,Yd);

if Yc=Yd and Xc=Xd, an output direction is local;

if Yc=Yd and Xc<Xd, an output direction is east;

if Yc=Yd and XnXd, an output direction is west;

if Yc*Yd, |Yc−Yd|=N/2, and Xc<Xd, an output direction is west;

if Yc*Yd, |Yc−Yd|=N/2, and Yc≥Yd, an output direction is east;

if Yc*Yd, |Yc−Yd|*N/2, and (Yt−Yc+N)% N>N/2, an output direction is north; or if Yc*Yd, |Xc−Yd|*N/2, and (Yt−Yc+N)% N≤N/2, an output direction is south, where (Xt,Yt) is determined in the following manner:

if Yd<N/2, letting (Xt1,Yt1)=(Xc,Yd), and (Xt2,Yt2)=(Xc,Yd+N/2);

otherwise, letting (Xt1,Yt1)=(Xc,Yd), and (Xt2,Yt2)=(Xc,Yd-N/2); and calculating Mint1=min(|Yt1−Yc|,N−|Yt1−Yc|), and Mint2=min(|Yt2−Yc|,N−|Yt2−Yc|);

if Mint1<Mint2, (Xt,Yt)=(Xt1,Tt1); otherwise, (Xt,Yt)=(Xt2,Yt2).

Based on the foregoing technical solutions, in the embodiments of the present disclosure, an optical network-on-chip is divided into two subnets, and every two IP cores share one gateway, and the gateway may be connected to different networks according to a requirement, which reduces a network diameter, reduces communication resources required for each communication task, decreases network congestion, and may not only improve network transmission bandwidth, but also reserve a characteristic of efficient partial transmission of data, such that network performance can be improved.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
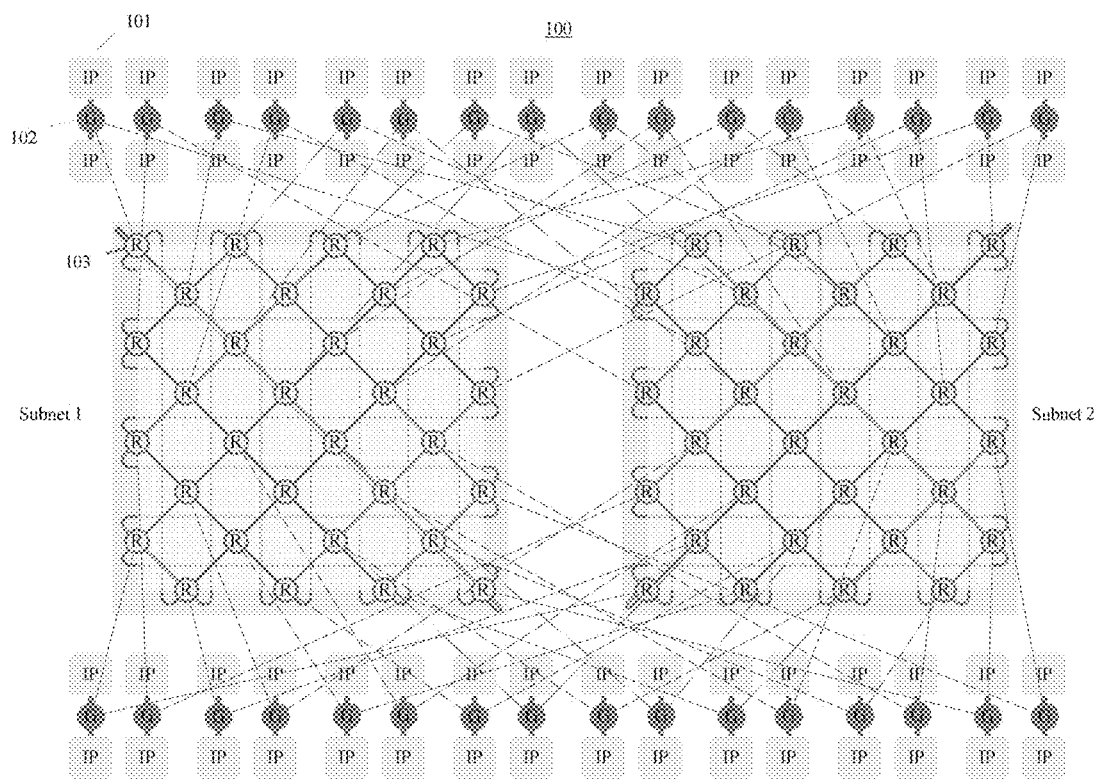
FIG. 1 is a schematic diagram of an optical network-on-chip according to an embodiment of the present disclosure.

FIG. 1 shows a schematic diagram of an optical network-on-chip 100 according to an embodiment of the present disclosure.

As shown in FIG. 1, the optical network-on-chip boo includes: N2 IP cores 101, N2/2 gateways 102, and N2 optical routers 103. N is an even number, and in FIG. 1, an example in which N=8 is used.

The N2 optical routers 103 form two subnets, and every N2/2 optical routers form one subnet, that is, a subnet 1 and a subnet 2 in FIG. 1. The two subnets work independently of each other.

Each gateway in the N2/2 gateways 102 is connected to every two IP cores in the N2 IP cores 101, where IP cores connected to different gateways are different, and the two IP cores connected to each gateway are in one-to-one correspondences with the two subnets.

That is, every two IP cores are one cluster, and N2 IP cores 101 form N2/2 clusters. Communication may be performed in each cluster in an electrical interconnection manner, and each cluster is connected to the subnet 1 and the subnet 2 using a gateway. Connection between each cluster and the subnet 1 and the subnet 2 is optical connection.

The N2/2 gateways 102 are in one-to-one correspondences with the N2/2 optical routers 103 in each subnet in the two subnets, where each gateway is connected to an optical router that is in each subnet and that is corresponding to each gateway. That is, each gateway is connected to two optical routers, and the two optical routers are respectively located in different subnets.

Each IP core can receive a signal from only a subnet corresponding to the IP core. That is, each gateway may send a signal sent by an optical router that is connected to the gateway and that is in each subnet to an IP core corresponding to the subnet.

Each gateway may send a signal of any IP core in two IP cores connected to the gateway to a subnet corresponding to a destination IP core of the signal, that is, sending the signal to an optical router that is connected to the gateway and that is in the subnet corresponding to the destination IP core of the signal.

Figure 2A:
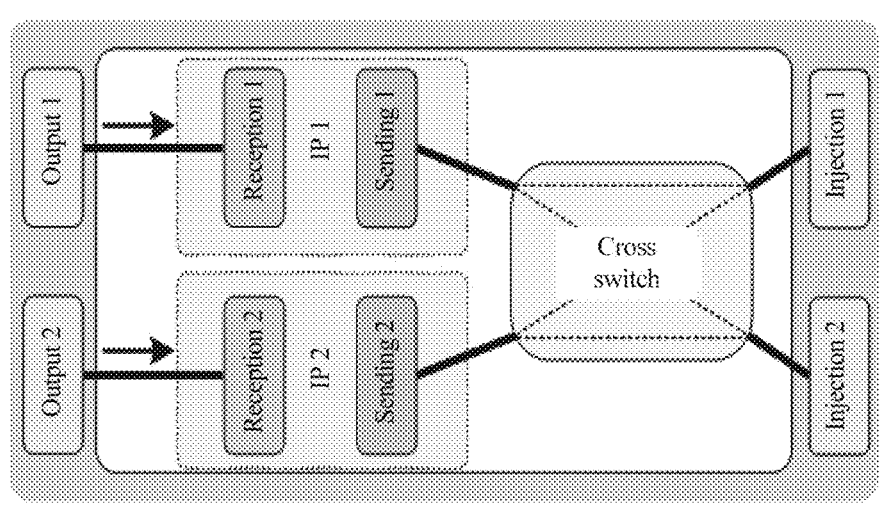
FIG. 2a is a schematic diagram of a function of a gateway according to an embodiment of the present disclosure.

FIG. 2*a* is a schematic diagram of a function of each gateway. As shown in FIG. 2*a*, when an IP core sends data, a gateway may inject, according to destination address information of a signal that is sent by any IP core in a cluster, the signal into a subnet corresponding to a destination IP core; and when the IP core receives data, each IP core can receive a signal that is output only from a subnet corresponding to the IP core.

After the signal is sent to each subnet, each subnet may route the signal, and finally send the signal to a gateway connected to the destination IP core of the signal, and the gateway sends the signal to the destination IP core.

Figure 2B:
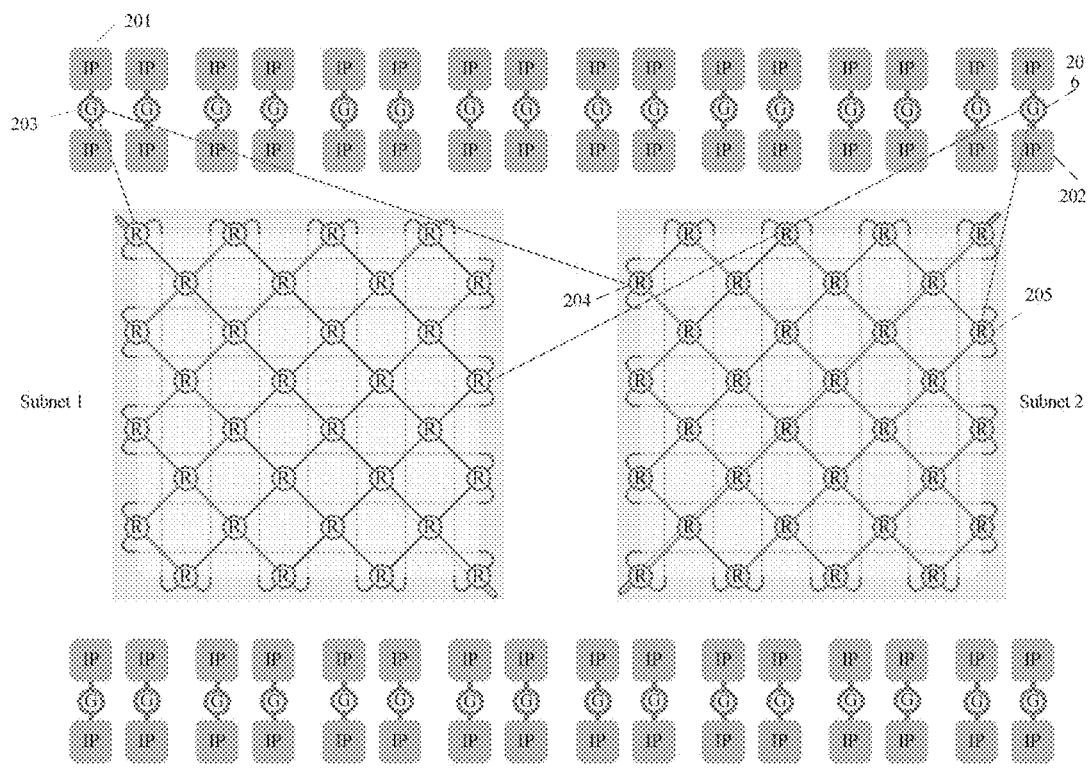
FIG. 2b is a schematic diagram of signal transmission in an optical network-on-chip according to an embodiment of the present disclosure.

FIG. 2*b* shows a schematic diagram of signal transmission in an optical network-on-chip according to an embodiment of the present disclosure.

FIG. 2*b* uses an example in which any IP core, presented as a first IP core 201, in N2 IP cores sends a signal, presented as a first signal, to a second IP core 202, where a connection relationship between a gateway and an optical router is omitted.

The first IP core 201 sends the first signal to a gateway 203 connected to the first IP core.

The gateway 203 connected to the first IP core 201 determines the second IP core 202 according to the first signal, and determines a subnet corresponding to the second IP core 202. Optionally, the gateway 203 may determine, according to a correspondence between an IP core and a subnet, the subnet corresponding to the second IP core 202, and the correspondence may be preset. For example, the subnet corresponding to the second IP core 202 is a subnet 2. The gateway 203 sends the first signal to a first optical router 204 in the subnet 2 corresponding to the second IP core 202, and the first optical router 204 is an optical router connected to the gateway 203 in the subnet 2.

The subnet 2 corresponding to the second IP core receives the first signal using the first optical router 204, and routes the first signal to a second optical router 205. The second optical router 205 is an optical router connected to a gateway 206 that is connected to the second IP core 202 in the subnet 2, and the second optical router 205 sends the first signal to the gateway 206 connected to the second IP core.

The gateway 206 connected to the second IP core 202 sends the first signal to the second IP core 202. Optionally, the gateway 206 connected to the second IP core 202 may send the first signal to the second IP core 202 according to the correspondence between an IP core and a subnet.

It can be learned from the foregoing that the signal from the first IP core 201 to the second IP core 202 is routed in only one subnet (the subnet 2), and a network hop count is relatively small. In other words, compared with a network formed by N2 optical routers, a subnet formed by N2/2 optical routers has a smaller network diameter.

Therefore, in this embodiment of the present disclosure, an optical network-on-chip is divided into two subnets, and every two IP cores share one gateway, and the gateway may be connected to different networks according to a requirement, which reduces a network diameter, reduces communication resources required for each communication task, decreases network congestion, and may not only improve network transmission bandwidth, but also reserve a characteristic of efficient partial transmission of data, such that network performance can be improved.

Optionally, in an embodiment of the present disclosure, each subnet may be a Torus topology.

Optionally, each optical router in each subnet may use an XY routing algorithm or a YX routing algorithm.

In the XY routing algorithm, an address of each node is (x,y), and a message is first routed along an X dimension, and then routed along a Y dimension. In the YX routing algorithm, an address of each node is (x,y), and a message is first routed along a Y dimension, and then routed along an X dimension.

Particularly, if a source and a destination are respectively (sx,sy) and (dx,dy), a routing message moves |dx−sx| steps on the X dimension, and then moves |dy−sy| steps on the Y dimension.

Both the XY routing algorithm and the YX routing algorithm belong to the prior art, and therefore are not limited in none of the embodiments of the present disclosure.

It should be understood that each subnet may also be another topology, for example, a Mesh topology, which is not limited in this embodiment of the present disclosure.

Figure 3:
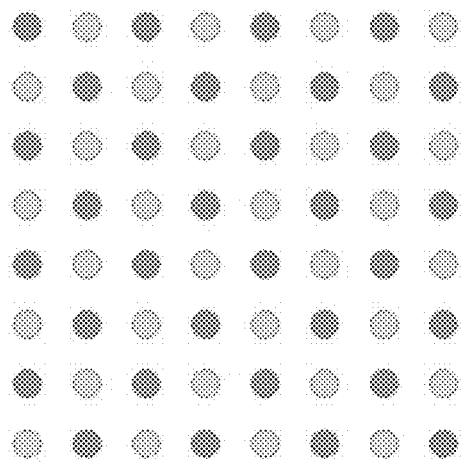
FIG. 3 is a schematic diagram of subnet division according to an embodiment of the present disclosure.

Optionally, in an embodiment of the present disclosure, two subnets may be formed in the following manner. As shown in FIG. 3, arranging N2 optical routers into N rows and N columns, where optical routers located in odd-numbered rows and odd-numbered columns and optical routers located in even-numbered rows and even-numbered columns (as shown by dark circles in FIG. 5) belong to one subnet, and optical routers located in odd-numbered rows and even-numbered columns and optical routers located in even-numbered rows and odd-numbered columns (as shown by light-colored circles in FIG. 5 ) belong to the other subnet.

Figure 4:
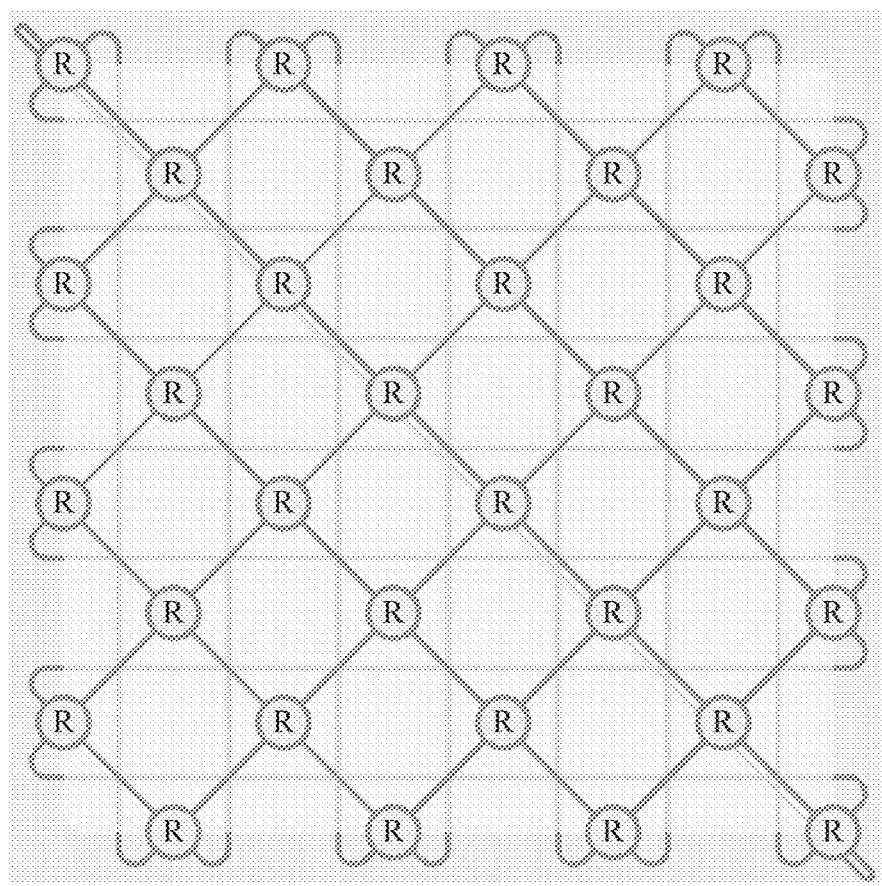
FIG. 4 is a schematic diagram of a connection relationship of a subnet 1 according to an embodiment of the present disclosure.
Figure 5:
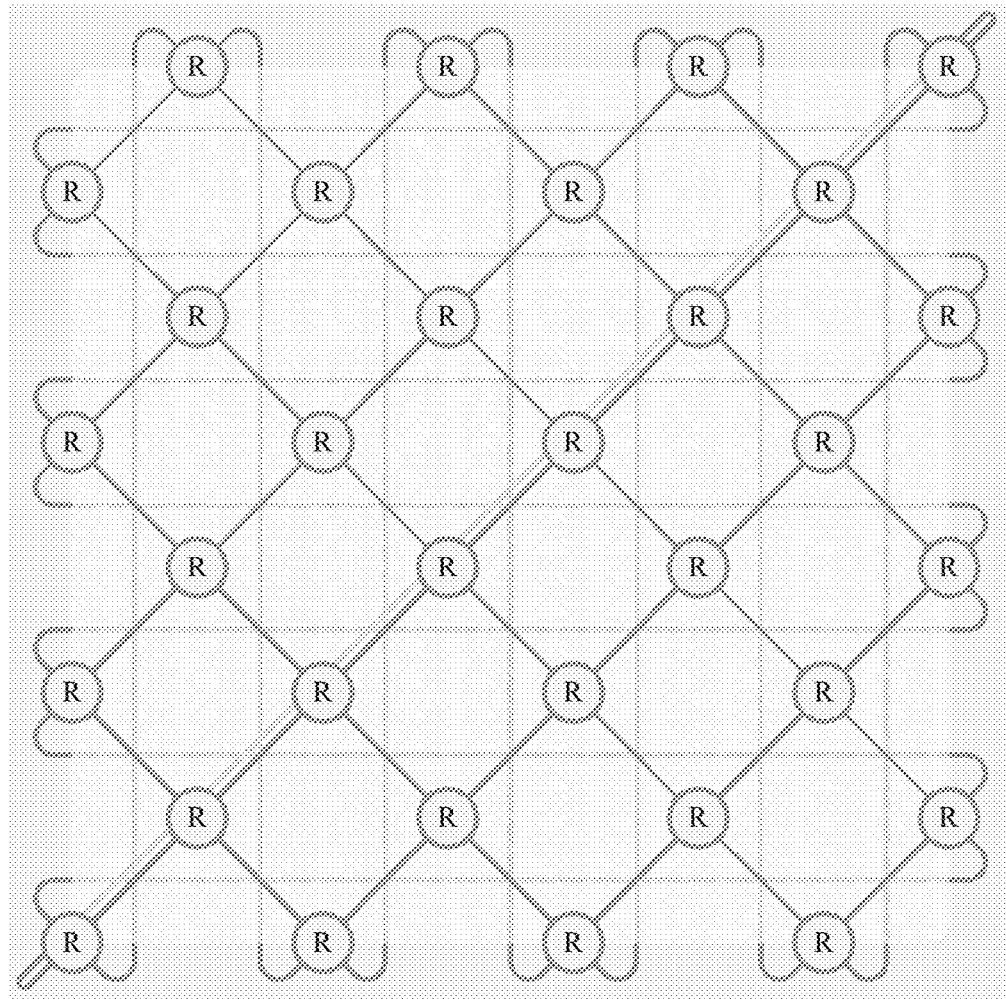
FIG. 5 is a schematic diagram of a connection relationship of a subnet 2 according to an embodiment of the present disclosure.

As shown in FIG. 4 and FIG. 5, in each subnet, each optical router stretches out a pair of parallel waveguides respectively in four directions of upper left, lower left, upper right, and lower right, where the pair of parallel waveguides are connected to waveguides stretched out by another optical router, and if the waveguides arrive at an included angle between subnet edges, the waveguides continue extending in an opposite direction, or if the waveguides arrive at a subnet edge, the waveguides continue extending in a direction perpendicular to the edge.

It should be understood that FIG. 4 and FIG. 5 are intended merely to show connection relationships between optical routers inside a subnet, and in actual implementation, a direction of a waveguide may be changed according to a layout requirement, provided that connection relationships shown in FIG. 4 and FIG. 5 are formed.

Optionally, in an embodiment of the present disclosure, coordinates may be allocated to the optical routers and the IP cores that are in the optical network-on-chip loo.

N2/2 optical routers in a same subnet in the two subnets have same Z coordinate, and optical routers in different subnets have different Z coordinates. For example, for an optical router in the subnet 1, Z=0, and for an optical router in the subnet 2, Z=1.

X and Y coordinates of each optical router in each subnet are allocated in the following manner: transforming each subnet to a Torus structure of N/2 rows and N columns, where optical routers in each row are in a transverse torus, and optical routers in a $j^{th}$ column and a $(j+N/2)^{th}$ column are in a longitudinal torus, where j=1, 2, . . . , N/2; and successively allocating X and Y coordinates to each optical router in each subnet using an optical router located in an upper left corner as an origin of coordinates, a horizontally rightward direction as an X positive direction, and a vertically downward direction as a Y positive direction, and returning to the original structure according to an inverse process, so as to complete allocation of the coordinates.

Figure 6A:
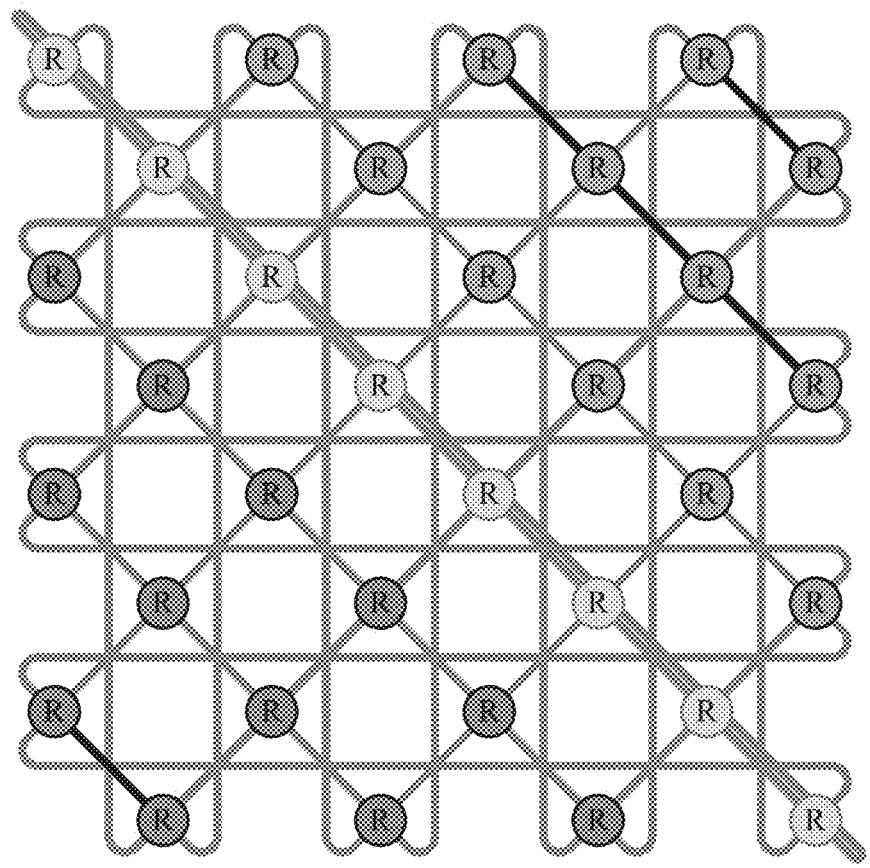
FIG. 6a to FIG. 6g are schematic diagrams of coordinates allocation according to an embodiment of the present disclosure.
Figure 6B:
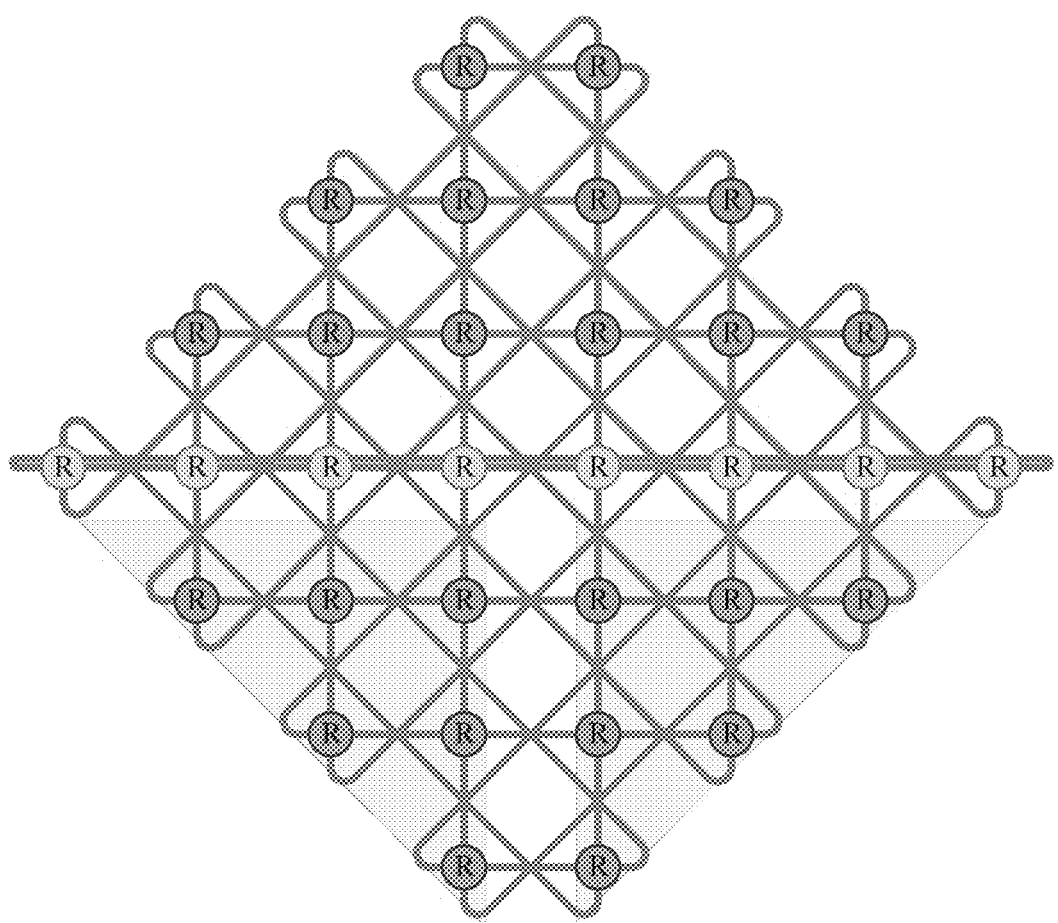
Figure 6C:
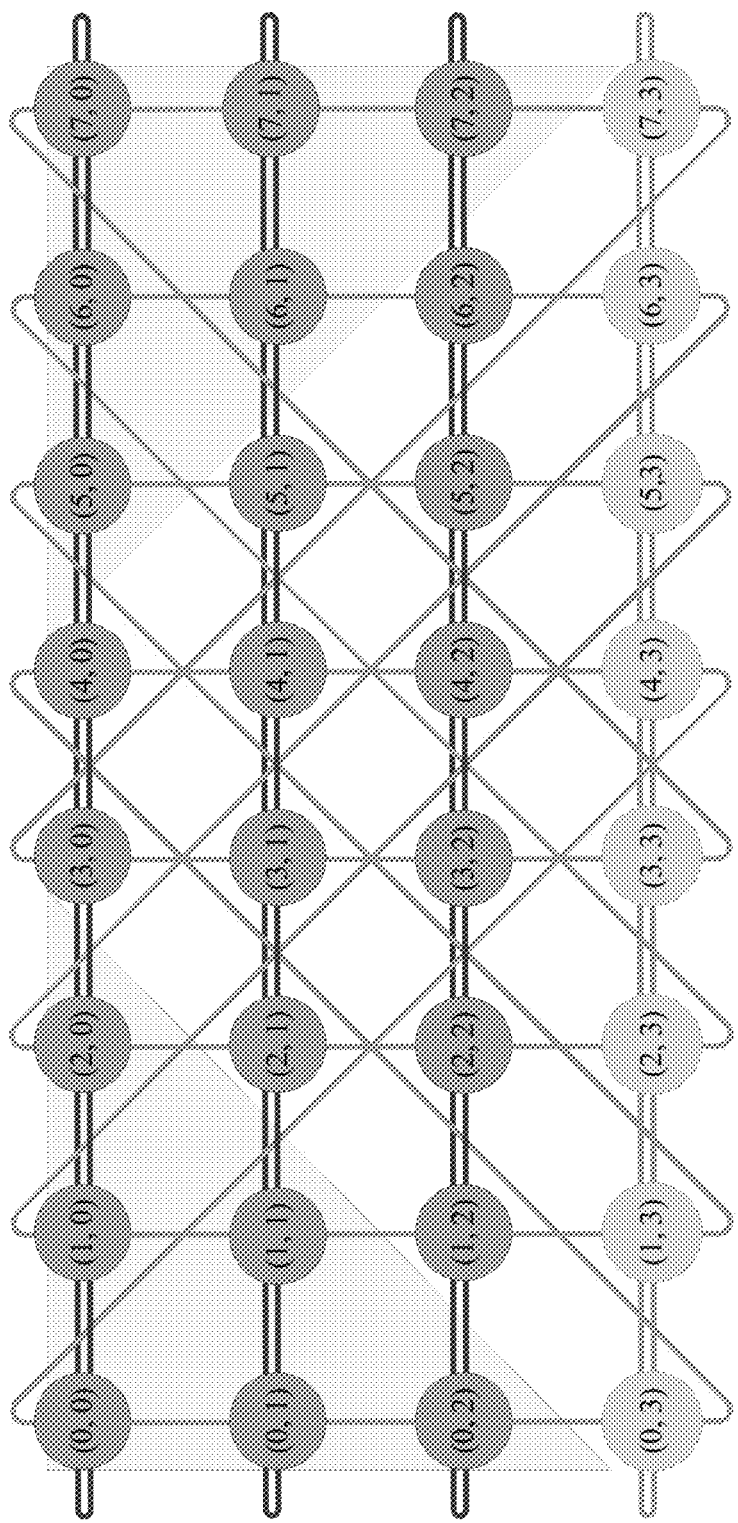
Figure 6D:
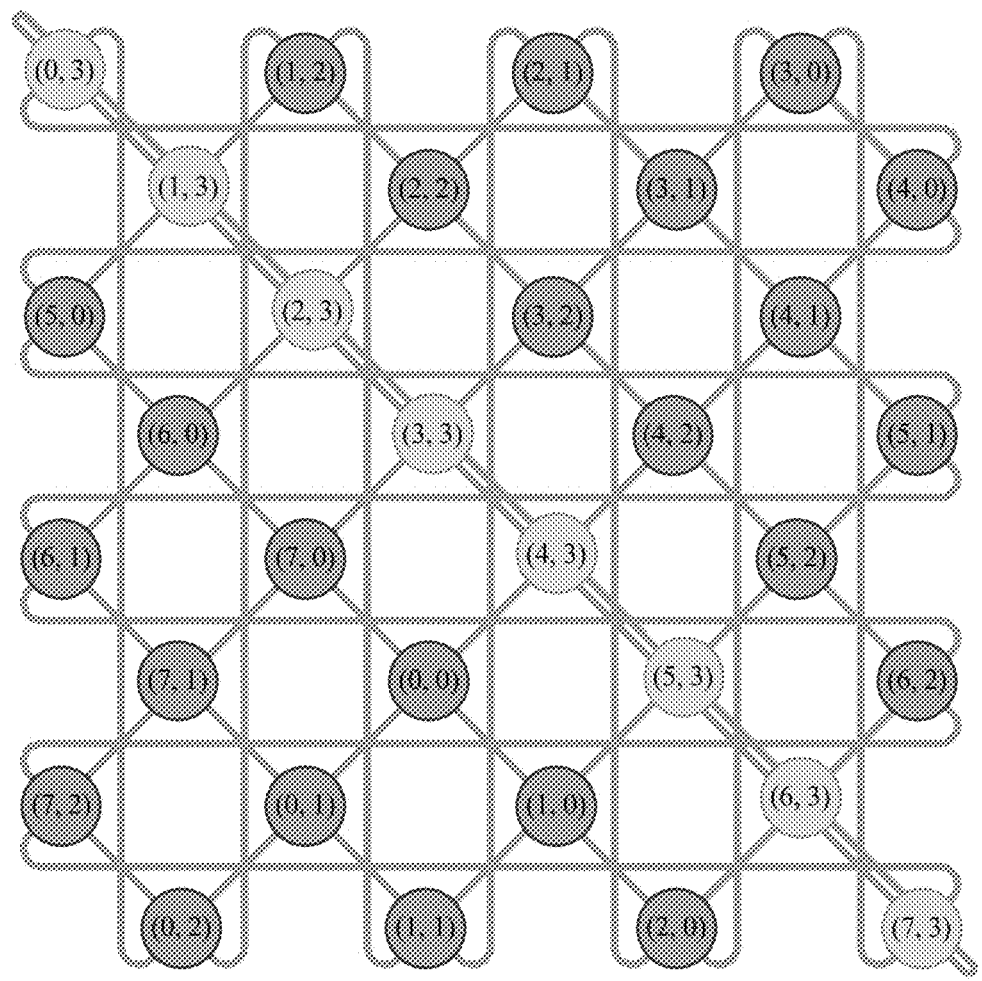

The subnet 1 is used as an example. A structure in FIG. 6a is rotated counterclockwise by 45 degrees, and then a structure shown in FIG. 6b may be obtained, and a lower left part and a lower right part that are shown in FIG. 6b are translated to locations shown in FIG. 6c, that is, the lower left part is moved to upper right, and the lower right part is moved to upper left. After this process, a subnet may be transformed to a Torus structure of N/2 rows and N columns, and in this structure, X and Y coordinates are successively allocated to each optical router using an optical router located in an upper left corner as an origin of coordinates, a horizontally rightward direction as an X positive direction, and a vertically downward direction as a Y positive direction, and the original structure is returned according to an inverse process (that is, the structure in FIG. 6c is returned to the structure in FIG. 6b, and then is returned to the structure in FIG. 6a), so as to complete allocation of the coordinates to an optical router, as shown in FIG. 6d.

Each IP core in two IP cores connected to each gateway and an optical router that is connected to each gateway and that is in the subnet corresponding to each IP core have same X, Y, and Z coordinates. In other words, for the two IP cores and the two optical routers that are connected to each gateway, coordinates of the two IP cores are different, but are respectively the same as coordinates of the two optical routers. An IP core can receive a signal that is output only by an optical router having the same coordinates as the IP core.

In this case, a gateway connected to a first IP core may determine, according to Z coordinates of a second IP core, a subnet corresponding to the second IP core.

Each optical router in each subnet may use the following routing algorithm: obtaining current node coordinates (Xc, Yc), and destination node coordinates (Xd,Yd);

if Xc=Xd and Yc=Yd, an output direction is local;
if Xc=Xd and Yc<Yd, an output direction is south;
if Xc=Xd and Yc≥Yd, an output direction is north;
if Xc≠Xd, |Xc−Xd|=N/2, and Yc<Yd, an output direction is north;
if Xc≠Xd, |Xc−Xd|=N/2, and Yc≥Yd, an output direction is south;
if Xc≠Xd, |Xc−Xd|≠N/2, and (Xt−Xc+N)% N>N/2, an output direction is west; or
if Xc≠Xd, |Xc−Xd|≠N/2, and (Xt−Xc+N)% N≤N/2, an output direction is east, where (Xt,Yt) is determined in the following manner:

if Xd<N/2, letting (Xt1,Yt1)=(Xd,Yc), and (Xt2,Yt2)=(Xd+N/2,Yc);
otherwise, letting (Xt1,Yt1)=(Xd,Yc), and (Xt2,Yt2)=(Xd−N/2,Yc); and
calculating Mint1=min(|Xt1−Xc|,N−|Xt1−Xc|), and Mint2 =min(|Xt2−Xc|,N−|Xt2−Xc|);
if Mint1<Mint2, (Xt,Yt)=(Xt1,Yt1); otherwise, (Xt,Yt)=(Xt2,Yt2).

Figure 7A:
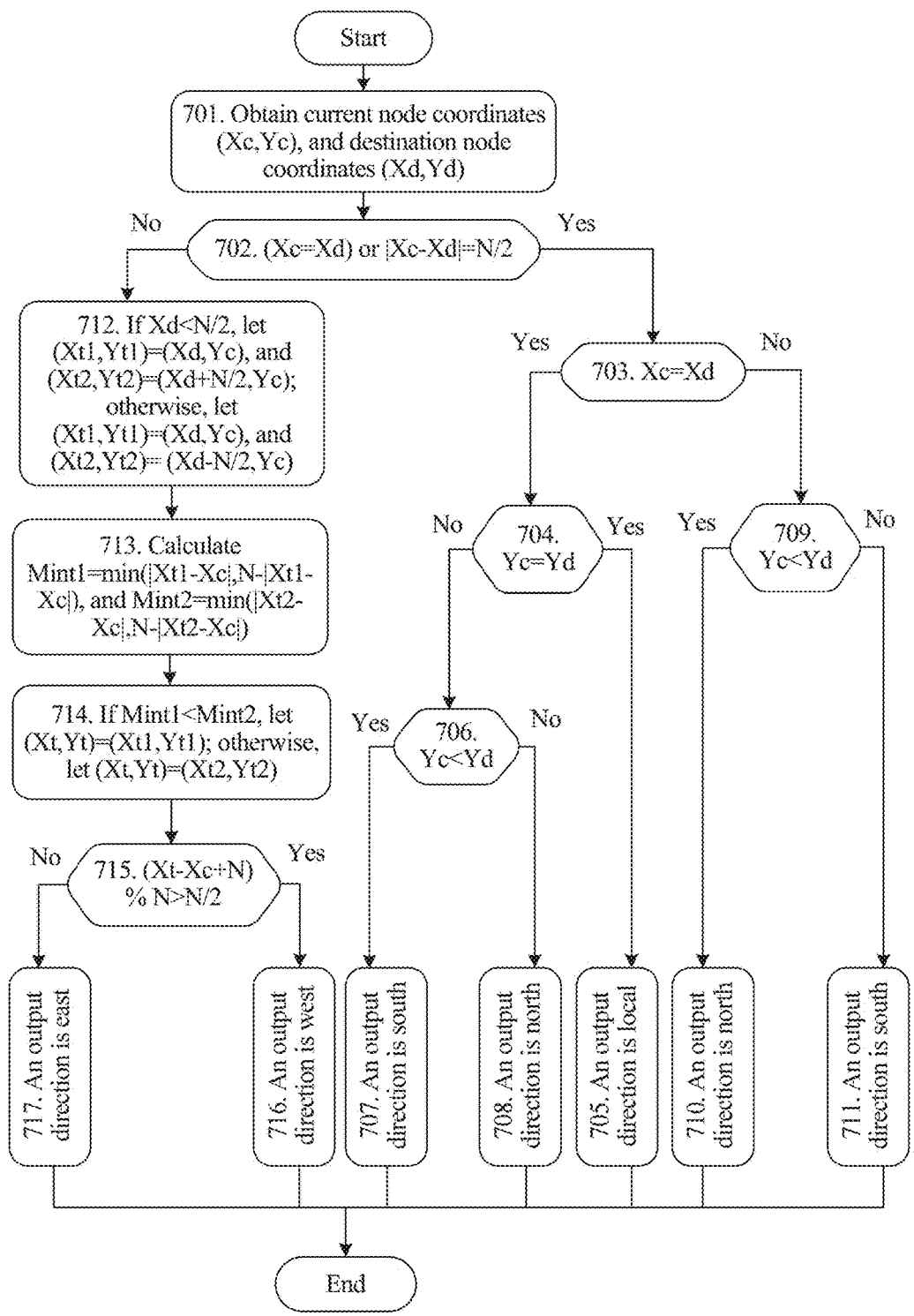
FIG. 7a is a schematic flowchart of a routing algorithm according to an embodiment of the present disclosure.

FIG. 7a is a schematic flowchart of the foregoing routing algorithm. The algorithm includes the following steps.

701. Obtain current node coordinates (Xc,Yc), and destination node coordinates (Xd,Yd).

702. Determine whether (Xc=Xd) or whether |Xc−Xd|=N/2; if yes, go to 703, or if no, go to 712.

703. Determine whether Xc=Xd; if yes, go to 704, or if no, go to 709.

704. Determine whether Yc=Yd; if yes, go to 705, or if no, go to 706.

705. An output direction is local.

706. Determine whether Yc<Yd; if yes, go to 707, or if no, go to 708.

707. An output direction is south.

708. An output direction is north.

709. Determine whether Yc<Yd; if yes, go to 710, or if no, go to 711.

710. An output direction is north.

711. An output direction is south.

712. If Xd<N/2, let (Xt1,Yt1)=(Xd,Yc), and (Xt2,Yt2)=(Xd+N/2,Yc); otherwise, let (Xt1,Yt1)=(Xd,Yc), and (Xt2,Yt2)=(Xd−N/2,Yc).

713. Calculate Mint1=min(|Xt1−Xc|,N−|Xt1−Xc|), and Mint2=min(|Xt2−Xc|,N−|Xt2−Xc|).

714. If Mint1<Mint2, let (Xt,Yt)=(Xt1,Yt1); otherwise, let (Xt,Yt)=(Xt2,Yt2).

715. Determine whether (Xt−Xc+N)% N>N/2; if yes, go to 716, or if no, go to 717, where % represents a remainder operation.

716. An output direction is west.

717. An output direction is east.

According to an interconnection structure of optical routers inside a subnet of an optical network-on-chip and a used routing algorithm in this embodiment of the present disclosure, a network diameter is only N/2, which further reduces communication resources required for each communication task, and decreases network congestion.

Optionally, in an embodiment of the present disclosure, each optical router in each subnet may be the following optical router 800 provided in this embodiment of the present disclosure.

Figure 8:
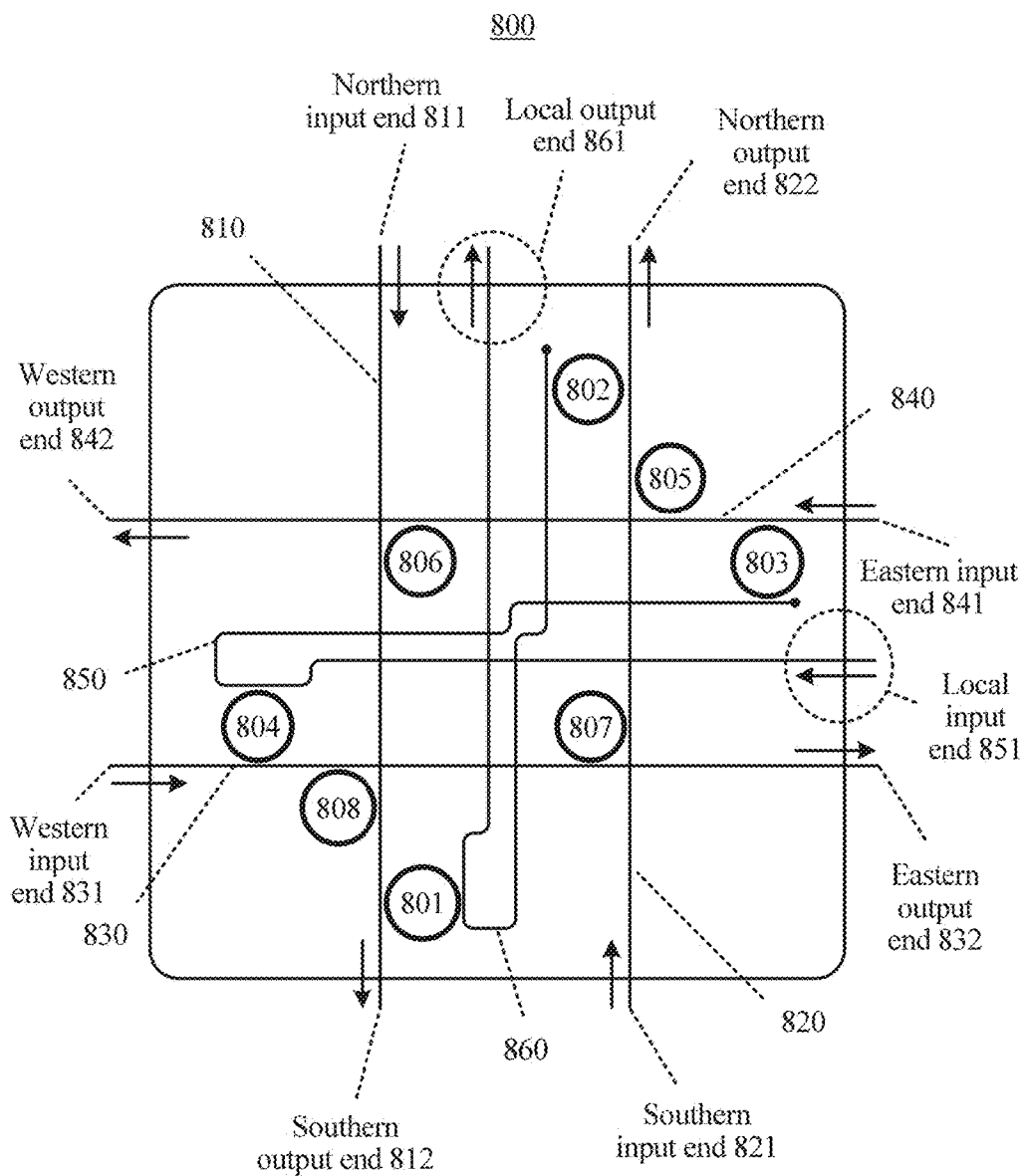
FIG. 8 is a schematic structural diagram of an optical router according to an embodiment of the present disclosure.

FIG. 8 shows a schematic structural diagram of an optical router 800 according to an embodiment of the present disclosure. As shown in FIG. 8, the optical router 800 includes the following. Eight microring resonators are included, which are respectively a first microring resonator 801, a second microring resonator 802, a third microring resonator 803, a fourth microring resonator 804, a fifth microring resonator 805, a sixth microring resonator 806, a seventh microring resonator 807, and an eighth microring resonator 808. Six waveguides are included, which are respectively a first waveguide 810, a second waveguide 820, a third waveguide 830, a fourth waveguide 840, a fifth waveguide 850, and a sixth waveguide 860.

One end of the first waveguide 810 is a northern input end 811, and the other end is a southern output end 812.

One end of the second waveguide 820 is a southern input end 821, and the other end is a northern output end 822.

One end of the third waveguide 830 is a western input end 831, and the other end is an eastern output end 832.

One end of the fourth waveguide 840 is an eastern input end 841, and the other end is a western output end 842.

One end of the fifth waveguide 850 is a local input end 851.

One end of the sixth waveguide 860 is a local output end 861.

A signal that is input at the northern input end 811 arrives at the local output end 861 through the first waveguide 810, the first microring resonator 801, and the sixth waveguide 860.

A signal that is input at the southern input end 821 arrives at the local output end 861 through the second waveguide 820, the second microring resonator 802, and the sixth waveguide 860.

A signal that is input at the western input end 831 arrives at the local output end 861 through the third waveguide 830, the eighth microring resonator 808, the first waveguide 810, the first microring resonator 801, and the sixth waveguide 860.

A signal that is input at the eastern input end 841 arrives at the local output end 861 through the fourth waveguide 840, the fifth microring resonator 805, the second waveguide 820, the second microring resonator 802, and the sixth waveguide 860.

A signal that is input at the local input end 851 arrives at the eastern output end 832 through the fifth waveguide 850, the fourth microring resonator 804, and the third waveguide 830.

The signal that is input at the local input end 851 arrives at the western output end 842 through the fifth waveguide 850, the third microring resonator 803, and the fourth waveguide 840.

The signal that is input at the local input end 851 arrives at the southern output end 812 through the fifth waveguide 850, the fourth microring resonator 804, the third waveguide 830, the eighth microring resonator 808, and the first waveguide 810.

The signal that is input at the local input end 851 arrives at the northern output end 822 through the fifth waveguide 850, the third microring resonator 803, the fourth waveguide 840, the fifth microring resonator 805, and the second waveguide 820.

The signal that is input at the eastern input end 841 arrives at the northern output end 822 through the fourth waveguide 840, the fifth microring resonator 805, and the second waveguide 820.

The signal that is input at the eastern input end 841 arrives at the southern output end 812 through the fourth waveguide 840, the sixth microring resonator 806, and the first waveguide 810.

The signal that is input at the western input end 831 arrives at the northern output end 822 through the third waveguide 830, the seventh microring resonator 807, and the second waveguide 820.

The signal that is input at the western input end 831 arrives at the southern output end 812 through the third waveguide 830, the eighth microring resonator 808, and the first waveguide 810.

According to the optical router in this embodiment of the present disclosure, a quantity of used microring resonators is reduced, and utilization of each microring resonator is improved.

It should be understood that in this embodiment of the present disclosure, each optical router in each subnet may also be a Crux optical router, which is not limited in this embodiment of the present disclosure.

Figure 9:
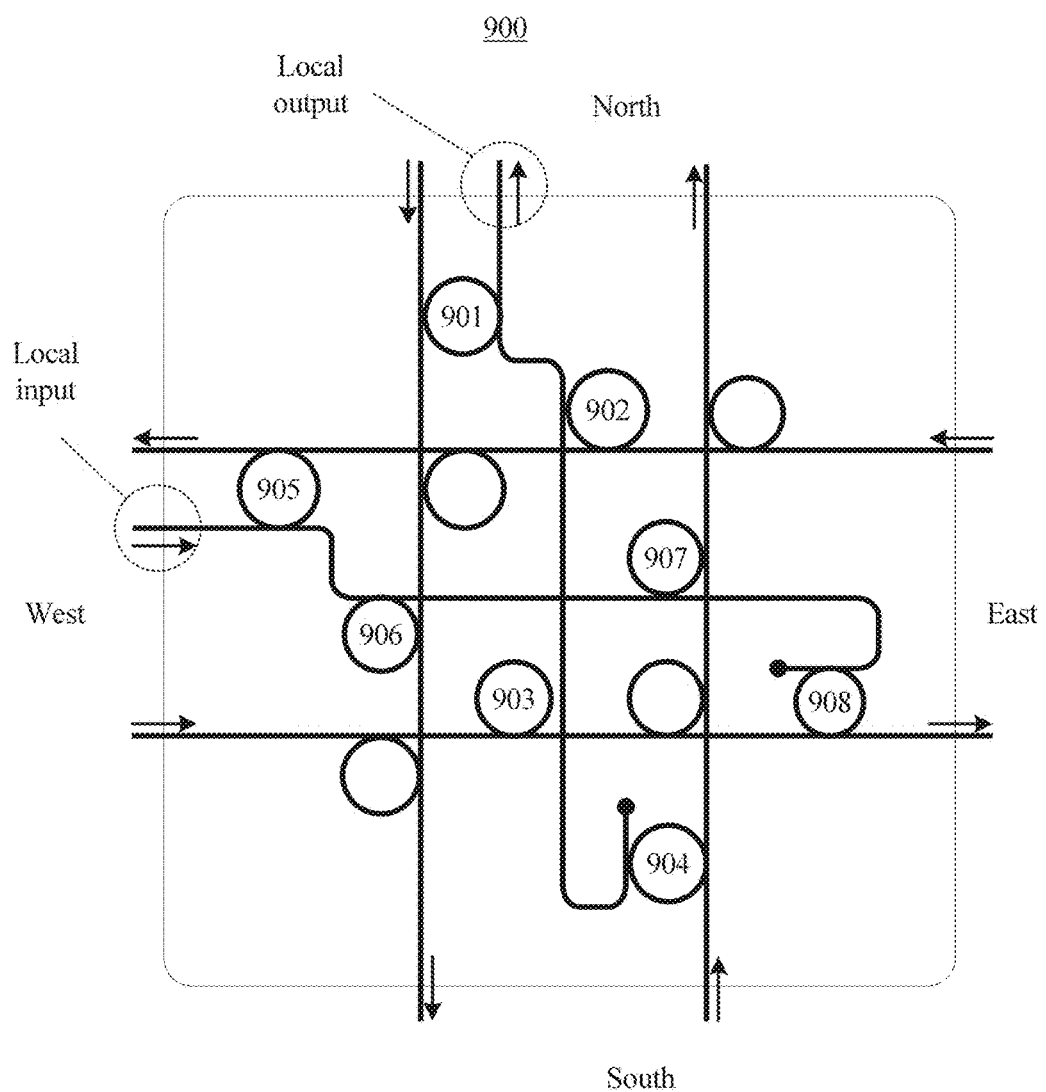
FIG. 9 is a schematic structural diagram of a Crux optical router.

FIG. 9 is a schematic structural diagram of a Crux optical router. The optical router 900 includes 12 microring resonators, where microring resonators 901, 902, 903, and 904 are configured to receive optical signals from four directions so as to transmit the optical signals to a local place; microring resonators 905, 906, 907, and 908 are configured to couple locally sent optical signals to four different directions; and the remaining four microring resonators are configured to implement deflection of routed signals.

Embodiments of the present disclosure further provide a manner of allocating coordinates to optical routers and IP cores that are in an optical network-on-chip 100.

Specifically, N2/2 optical routers in a same subnet in two subnets have same Z coordinates, and optical routers in different subnets have different Z coordinates. For example, for an optical router in the subnet 1, Z=0, and for an optical router in the subnet 2, Z=1.

X and Y coordinates of each optical router in each subnet are allocated in the following manner: transforming each subnet to a Torus structure of N rows and N/2 columns, where optical routers in each column are in a longitudinal torus, and optical routers in an $i^{th}$ row and an $(i+N/2)^{th}$ row are in a transverse torus, where i=1,2, . . . , N/2; and successively allocating X and Y coordinates to each optical router in each subnet using an optical router located in an upper left corner as an origin of coordinates, a horizontally rightward direction as an X positive direction, and a vertically downward direction as a Y positive direction, and returning to the original structure according to an inverse process, so as to complete allocation of the coordinates.

Figure 6E:
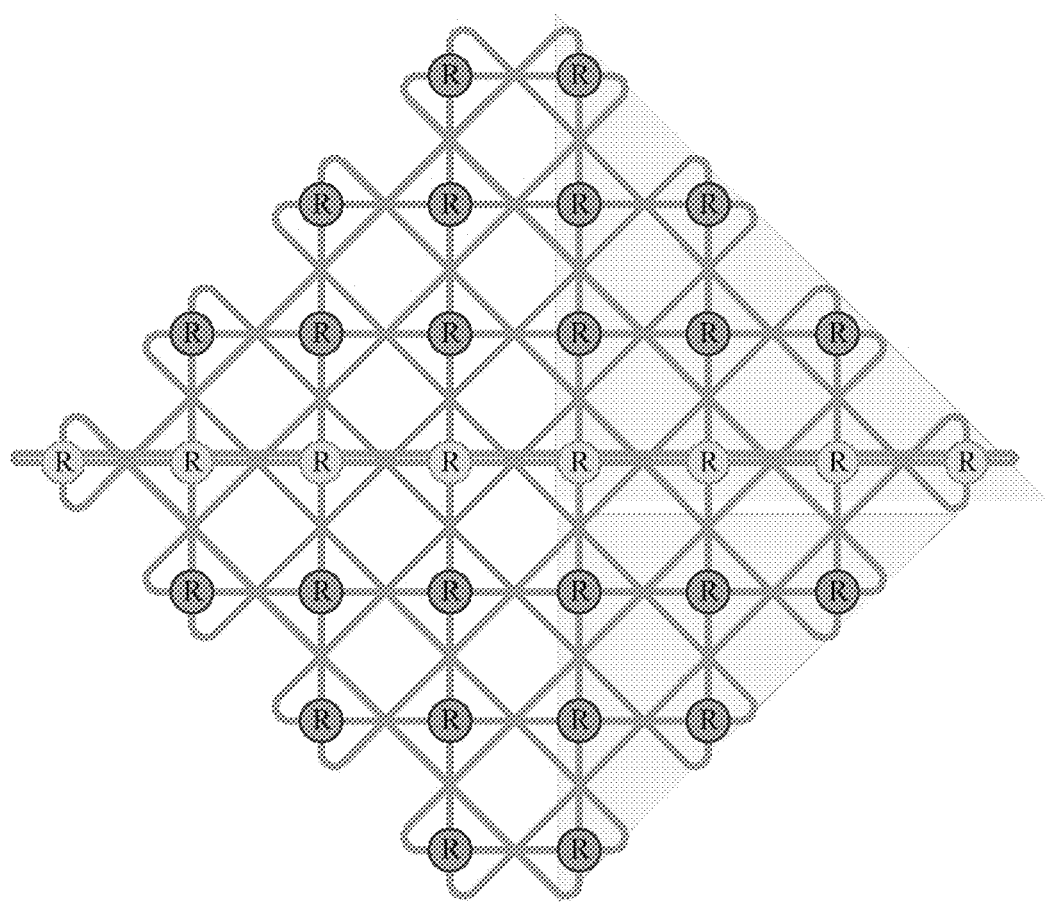
Figure 6F:
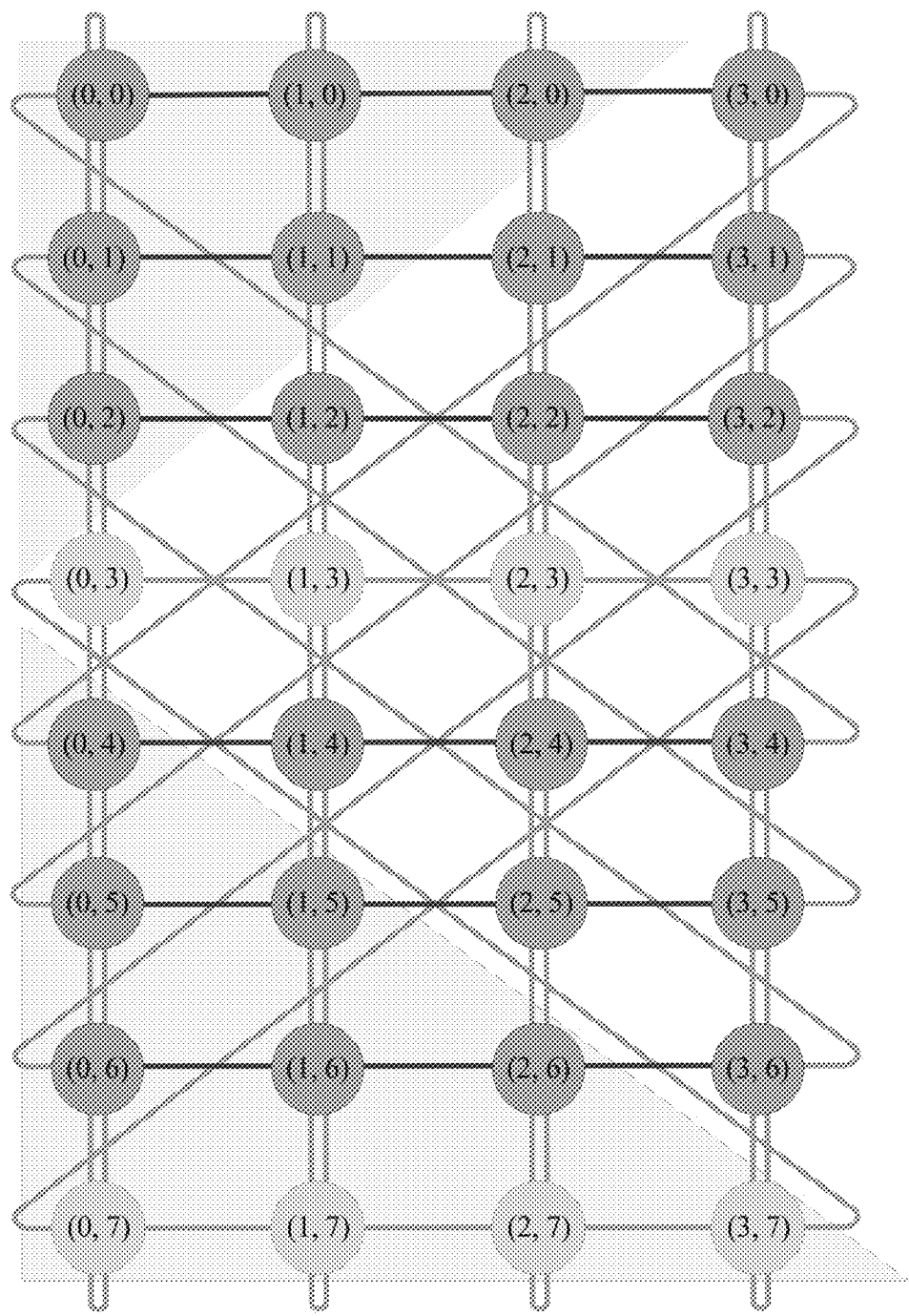
Figure 6G:
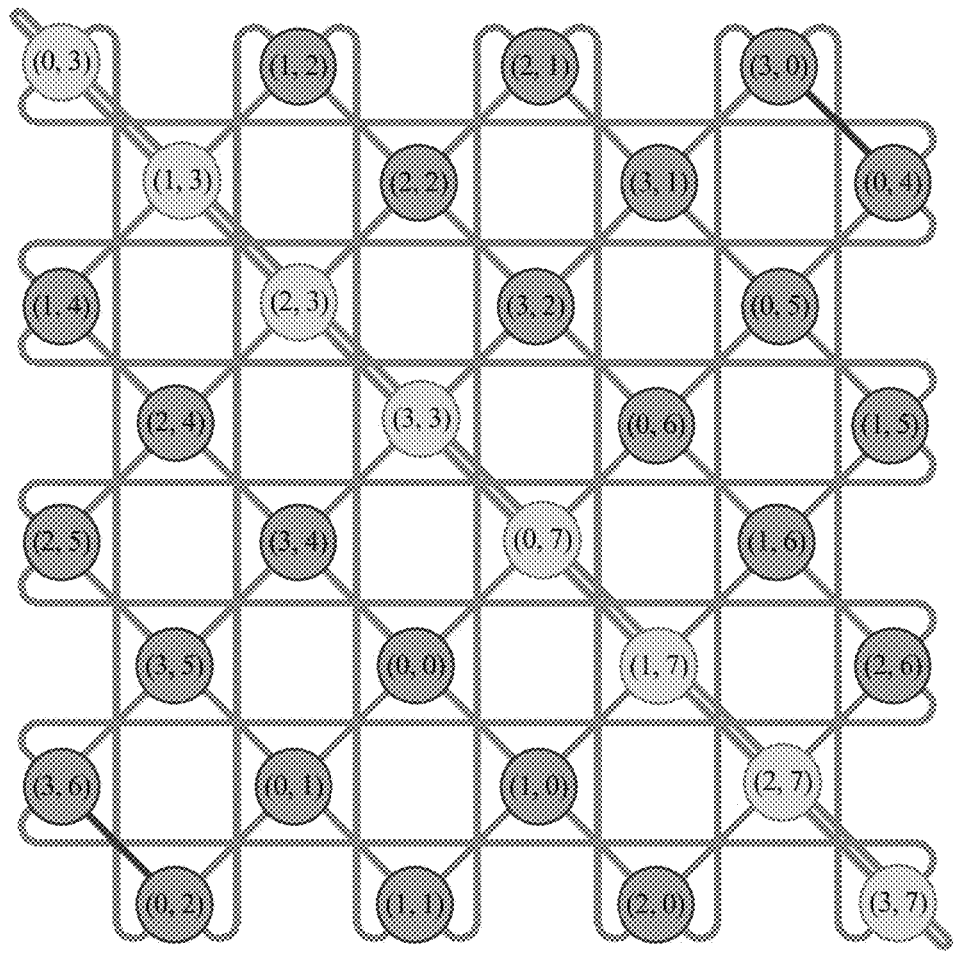

The subnet 1 is used as an example. A structure in FIG. 6a is rotated counterclockwise by 45 degrees, and then a structure shown in FIG. 6e may be obtained, and an upper right part and a lower right part that are shown in FIG. 6e are translated to locations shown in FIG. 6f, that is, the upper right part is moved to lower left, and the lower right part is moved to upper left. After this process, a subnet may be transformed to a Torus structure of N rows and N/2 columns, and in this structure, X and Y coordinates are successively allocated to each optical router using an optical router located in an upper left corner as an origin of coordinates, a horizontally rightward direction as an X positive direction, and a vertically downward direction as a Y positive direction, and the original structure is returned according to an inverse process (that is, the structure in FIG. 6f is returned to the structure in FIGS. 6e, and then is returned to the structure in FIG. 6a), so as to complete allocation of the coordinates to an optical router, as shown in FIG. 6g.

Each IP core in two IP cores connected to each gateway and an optical router that is connected to each gateway and that is in a subnet corresponding to each IP core have same X, Y, and Z coordinates. In other words, for the two IP cores and the two optical routers that are connected to each gateway, coordinates of the two IP cores are different, but are respectively the same as coordinates of the two optical routers. An IP core can receive a signal that is output only by an optical router having the same coordinates as the IP core.

In this case, a gateway connected to a first IP core may determine, according to Z coordinates of a second IP core, a subnet corresponding to the second IP core.

In this embodiment, each optical router in each subnet may use the following routing algorithm:
obtaining current node coordinates $(Xc,Yc)$, and destination node coordinates $(Xd,Yd)$;
if $Yc=Yd$ and $Xc=Xd$, an output direction is local;
if $Yc=Yd$ and $Xc<Xd$, an output direction is east;
if $Yc=Yd$ and $XnXd$, an output direction is west;
if $Yc \neq Yd$, $|Yc-Yd|=N/2$, and $Xc<Xd$, an output direction is west;
if $Yc \neq Yd$, $|Yc-Yd|=N/2$, and $Yc \geq Yd$, an output direction is east;
if $Yc \neq Yd$, $|Yc-Yd| \neq N/2$, and $(Yt-Yc+N)\% N>N/2$, an output direction is north; or
if $Yc \neq Yd$, $|Xc-Yd| \neq N/2$, and $(Yt-Yc+N)\% N \leq N/2$, an output direction is south, where $(Xt,Yt)$ is determined in the following manner:
if $Yd<N/2$, letting $(Xt1,Yt1)=(Xc,Yd)$, and $(Xt2,Yt2)=(Xc,Yd+N/2)$;
otherwise, letting $(Xt1,Yt1)=(Xc,Yd)$, and $(Xt2,Yt2)=(Xc,Yd-N/2)$; and
calculating $Mint1=min(|Yt1-Yc|,N-|Yt1-Yc|)$, and $Mint2=min(|Yt2-Yc|,N-|Yt2-Yc|)$;
if $Mint1<Mint2$, $(Xt,Yt)=(Xt1,Yt1)$; otherwise, $(Xt,Yt)=(Xt2,Yt2)$.

Figure 7B:
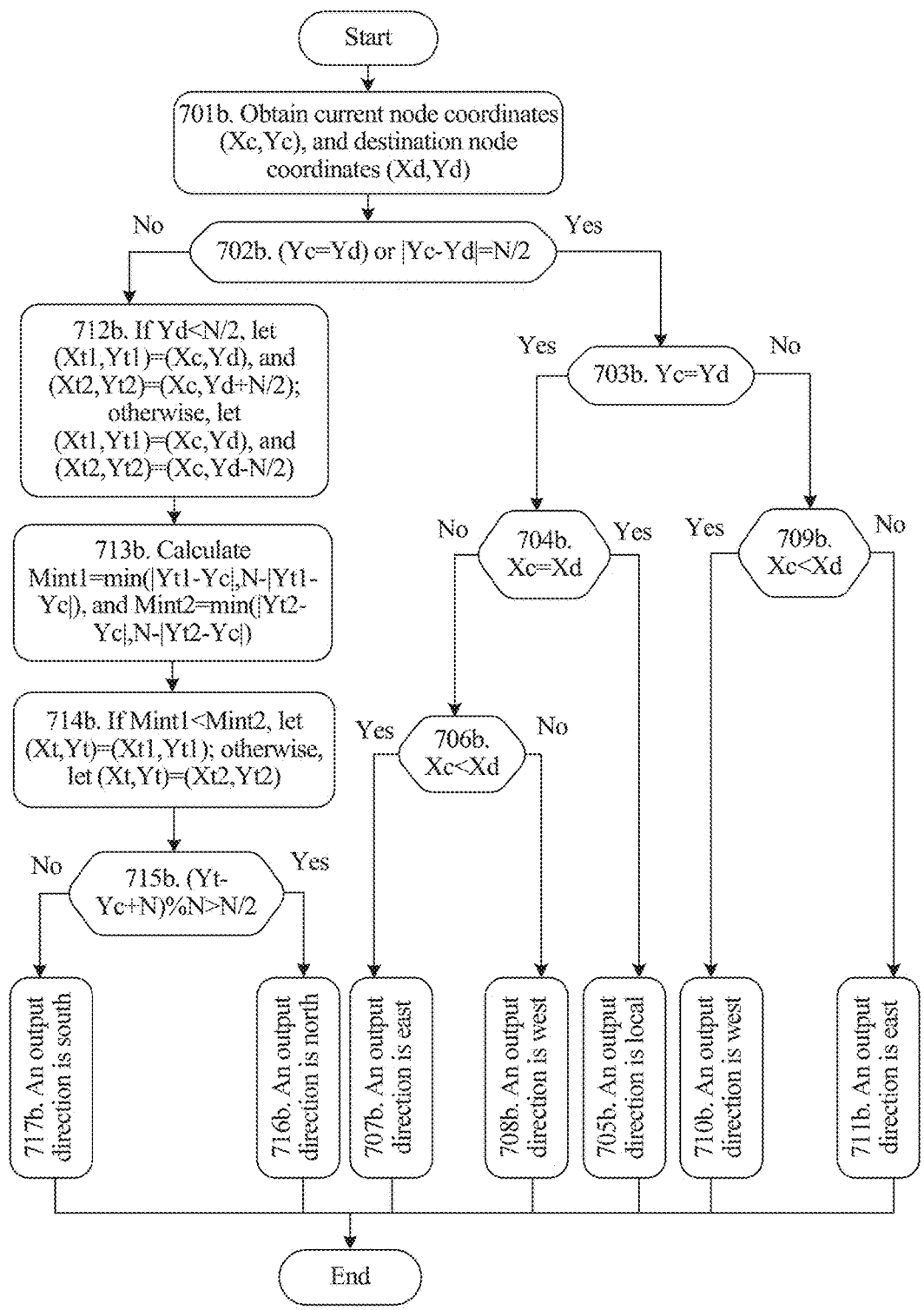
FIG. 7b is a schematic flowchart of a routing algorithm according to another embodiment of the present disclosure.

FIG. 7b is a schematic flowchart of the foregoing routing algorithm.

701b. Obtain current node coordinates $(Xc,Yc)$, and destination node coordinates $(Xd,Yd)$.

702b. Determine whether $(Yc=Yd)$ or $|Yc-Yd|=N/2$; if yes, go to 703b, or if no, go to 712b.

703b. Determine whether $Yc=Yd$; if yes, go to 704b, or if no, go to 709b.

704b. Determine whether $Xc=Xd$; if yes, go to 705b, or if no, go to 706b.

705b. An output direction is local.

706b. Determine whether $Xc<Xd$; if yes, go to 707b, or if no, go to 708b.

707b. An output direction is east.

708b. An output direction is west.

709b. Determine whether $Xc<Xd$; if yes, go to 710b, or if no, go to 711b.

710b. An output direction is west.

711b. An output direction is east.

712. If $Yd<N/2$, let $(Xt1,Yt1)=(Xc,Yd)$, and $(Xt2,Yt2)=(Xc,Yd+N/2)$, otherwise, let $(Xt1,Yt1)=(Xc,Yd)$, and $(Xt2,Yt2)=(Xc,Yd-N/2)$.

713b. Calculate $Mint1=min(|Yt1-Yc|,N-|Yt1-Yc|)$, and $Mint2=min(|Yt2-Yc|,N-|Yt2-Yc|)$.

714b. If $Mint1<Mint2$, let $(Xt,Yt)=(Xt1,Yt1)$; otherwise, let $(Xt,Yt)=(Xt2,Yt2)$.

715b. Determine whether $(Yt-Yc+N)\% N>N/2$; if yes, go to 716b, or if no, go to 717b, where % represents a remainder operation.

716b. An output direction is north.

717b. An output direction is south.

Optionally, in this embodiment, each optical router in each subnet may be the following optical router woo provided in an embodiment of the present disclosure.

Figure 10:
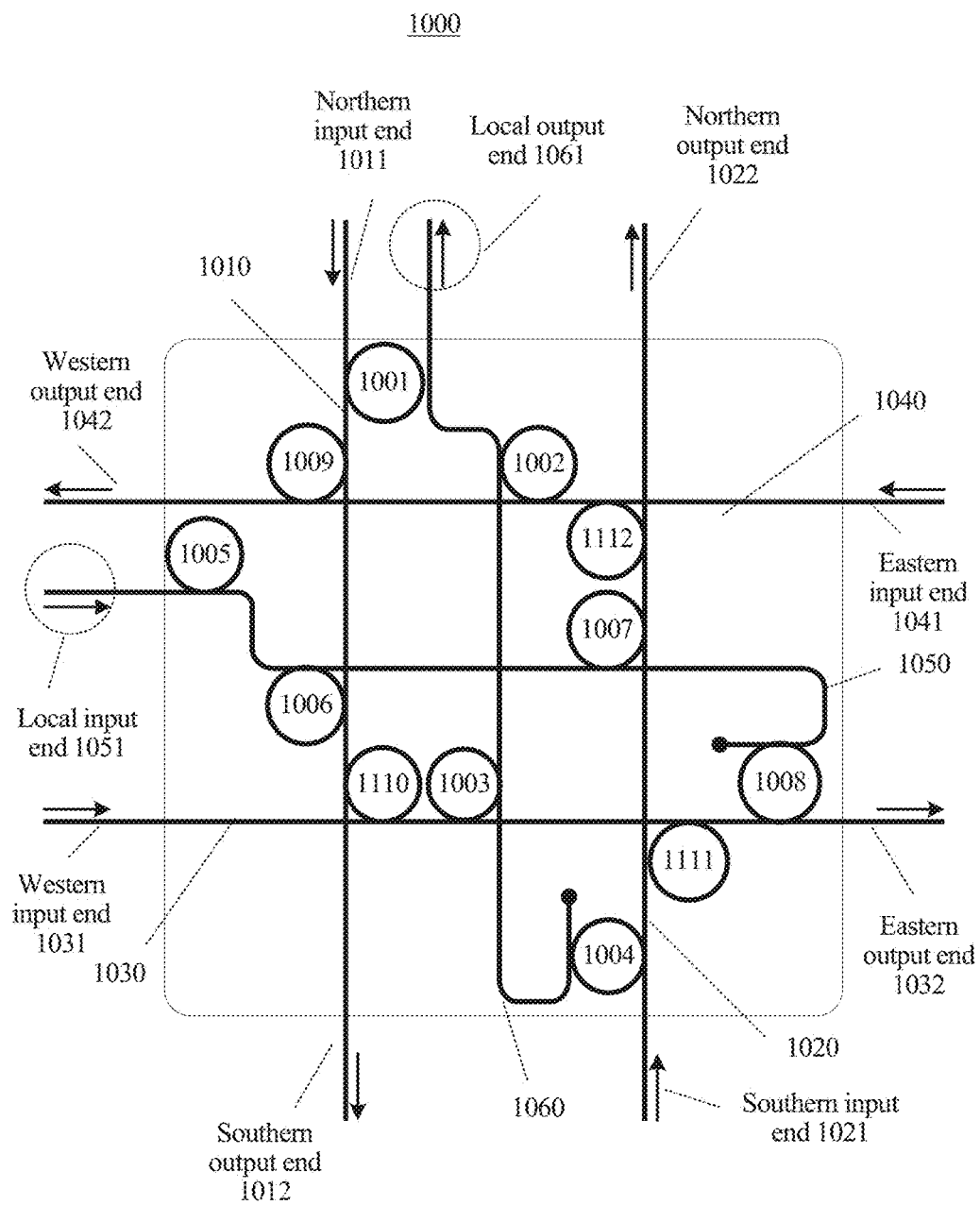
FIG. 10 is a schematic structural diagram of an optical router according to another embodiment of the present disclosure.

FIG. 10 shows a schematic structural diagram of an optical router woo according to an embodiment of the present disclosure. As shown in FIG. 10, the optical router woo includes a first microring resonator low, a second microring resonator 1002, a third microring resonator 1003, a fourth microring resonator 1004, a fifth microring resonator 1005, a sixth microring resonator 1006, a seventh microring resonator 1007, an eighth microring resonator 1008, a ninth microring resonator 1009, a tenth microring resonator 1110, an eleventh microring resonator 1111, and a twelfth microring resonator 1112; and a first waveguide low, a second waveguide 1020, a third waveguide 1030, a fourth waveguide 1040, a fifth waveguide 1050, and a sixth waveguide 1060.

One end of the first waveguide 1010 is a northern input end 1011, and the other end is a southern output end 1012.

One end of the second waveguide 1020 is a southern input end 1021, and the other end is a northern output end 1022.

One end of the third waveguide 1030 is a western input end 1031, and the other end is an eastern output end 1032.

One end of the fourth waveguide 1040 is an eastern input end 1041, and the other end is a western output end 1042.

One end of the fifth waveguide 1050 is a local input end 1051.

One end of the sixth waveguide 1060 is a local output end 1061.

A signal that is input at the northern input end 1011 arrives at the local output end 1061 through the first waveguide 1010, the first microring resonator 1001, and the sixth waveguide 1060.

A signal that is input at the southern input end 1021 arrives at the local output end 1061 through the second waveguide 1020, the fourth microring resonator 1004, and the sixth waveguide 1060.

A signal that is input at the western input end 1031 arrives at the local output end 1061 through the third waveguide 1030, the third microring resonator 1003, and the sixth waveguide 1060.

A signal that is input at the eastern input end 1041 arrives at the local output end 1061 through the fourth waveguide 1040, the second microring resonator 1002, and the sixth waveguide 1060.

A signal that is input at the local input end 1051 arrives at the eastern output end 1032 through the fifth waveguide 1050, the eighth microring resonator 1008, and the third waveguide 1030.

The signal that is input at the local input end 1051 arrives at the western output end 1042 through the fifth waveguide 1050, the fifth microring resonator 1005, and the fourth waveguide 1040.

The signal that is input at the local input end 1051 arrives at the southern output end 1012 through the fifth waveguide 1050, the sixth microring resonator 1006, and the first waveguide 1010.

The signal that is input at the local input end 1051 arrives at the northern output end 1022 through the fifth waveguide 1050, the seventh microring resonator 1007, and the second waveguide 1020.

The signal that is input at the northern input end 1011 arrives at the western output end 1042 through the first waveguide 1010, the ninth microring resonator 1009, and the fourth waveguide 1040.

The signal that is input at the northern input end 1011 arrives at the eastern output end 1032 through the first waveguide 1010, the tenth microring resonator 1110, and the third waveguide 1030.

The signal that is input at the southern input end 1021 arrives at the western output end 1042 through the second waveguide 1020, the twelfth microring resonator 1112, and the fourth waveguide 1040.

The signal that is input at the southern input end 1021 arrives at the eastern output end 1032 through the second waveguide 1020, the eleventh microring resonator 1111, and the third waveguide 1030.

Figure 11:
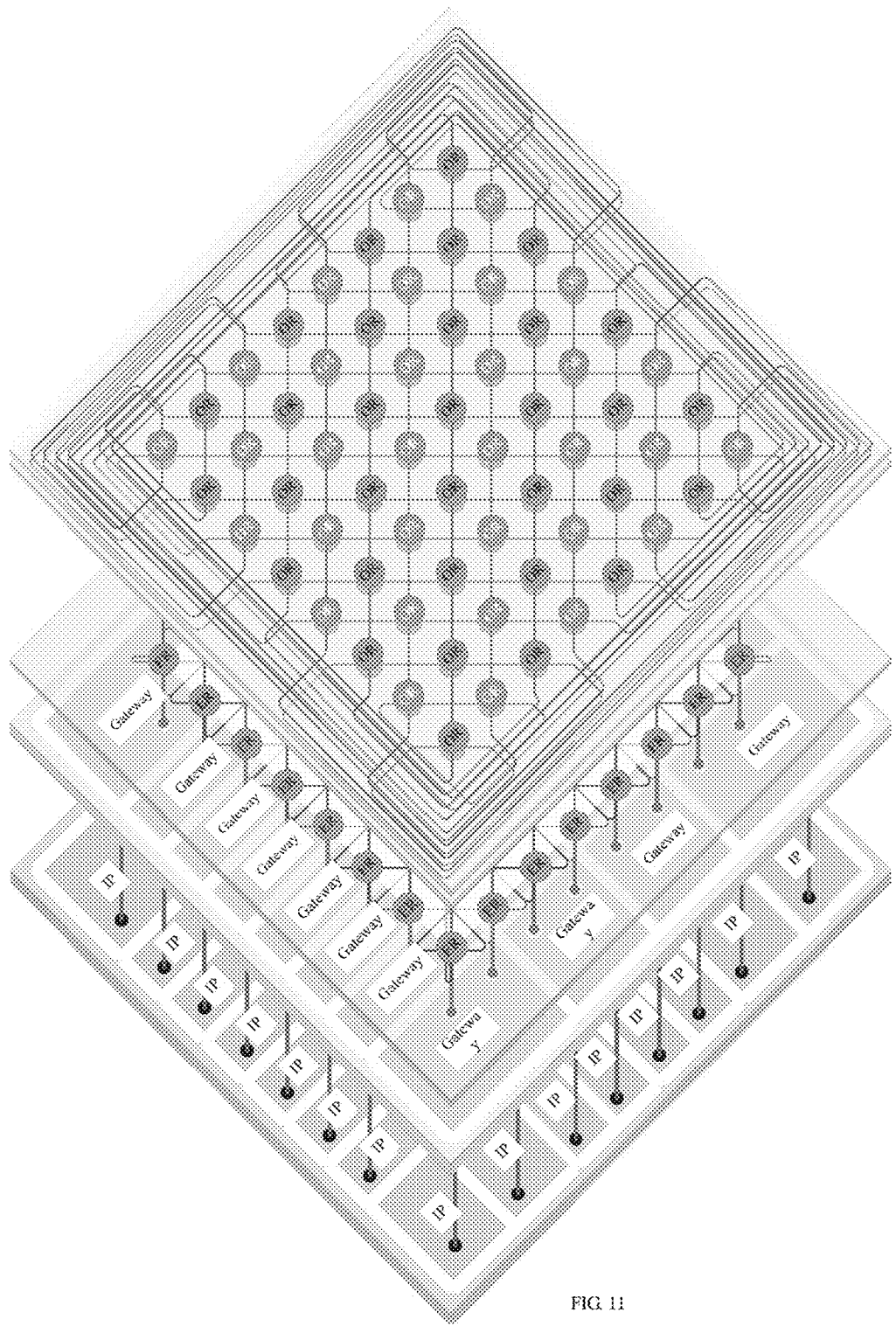
FIG. 11 is a schematic layout diagram of an optical network-on-chip according to an embodiment of the present disclosure.

FIG. 11 is a schematic layout diagram of an optical network-on-chip according to an embodiment of the present disclosure. As shown in FIG. 11, a bottom layer (a fourth layer) is an IP core layer, which is responsible for generating, receiving, and processing information; a third layer is a gateway layer, and every two IP cores are connected to a network using one gateway; a second layer is an electrical control layer, which is responsible for a switch status of a component of an optical transport network, and each subnet exclusively uses an electrical control layer; a top layer (a first layer) network is an optical transport network using a two-layer waveguide layout, and all waveguides in two subnets may be classified into horizontal waveguides and vertical waveguides according to an orientation. Dark waveguides in the FIG. are horizontal waveguides, light-colored waveguides are vertical waveguides, and the two types of waveguides are hierarchically placed to prevent occurrence of a large quantity of waveguide crossings.

Figure 12:
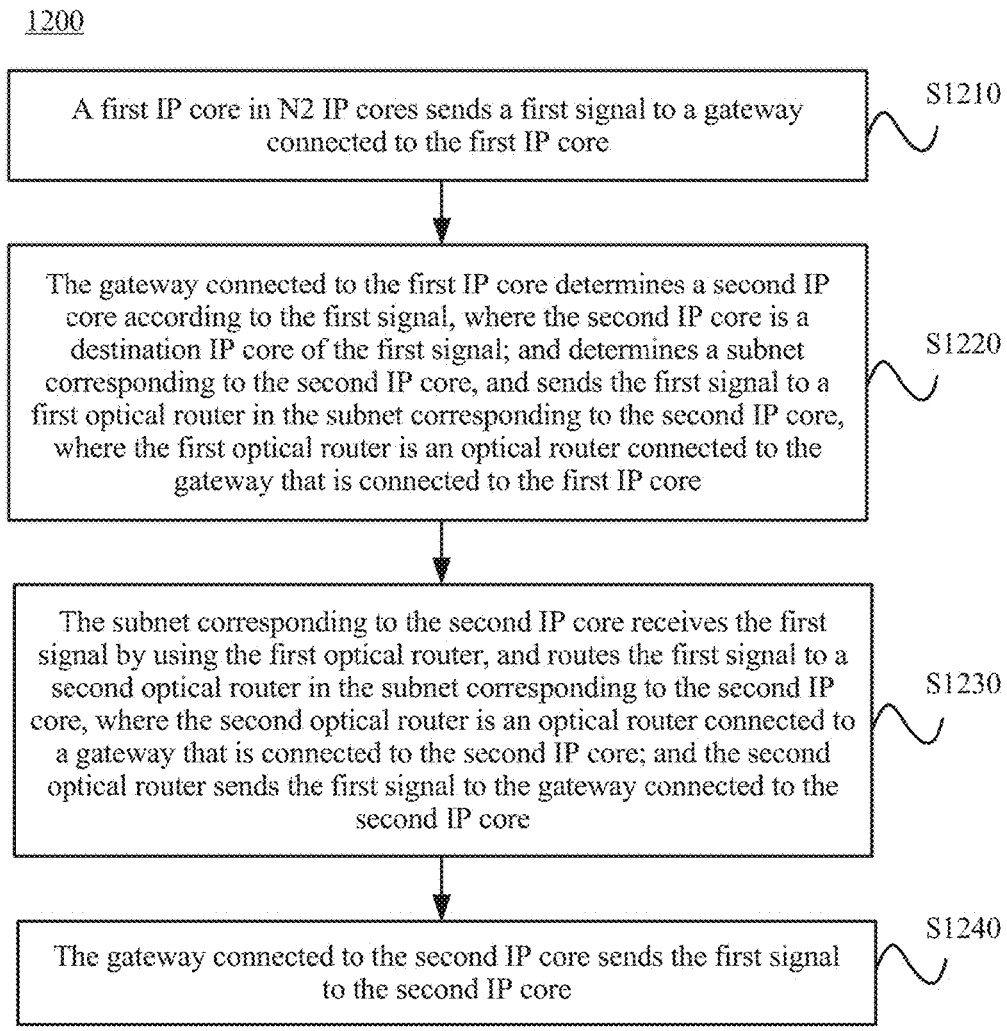
FIG. 12 is a schematic flowchart of a signal transmission method according to an embodiment of the present disclosure.

FIG. 12 shows a schematic flowchart of a signal transmission method 1200 in an optical network-on-chip 100.

As shown in FIG. 12, the method 1200 includes the following steps.

S1210. A first IP core in N2 IP cores sends a first signal to a gateway connected to the first IP core.

S1220. The gateway connected to the first IP core determines a second IP core according to the first signal, where the second IP core is a destination IP core of the first signal; and determines a subnet corresponding to the second IP core, and sends the first signal to a first optical router in the subnet corresponding to the second IP core, where the first optical router is an optical router connected to the gateway that is connected to the first IP core.

S1230. The subnet corresponding to the second IP core receives the first signal using the first optical router, and routes the first signal to a second optical router in the subnet corresponding to the second IP core, where the second optical router is an optical router connected to a gateway that is connected to the second IP core; and the second optical router sends the first signal to the gateway connected to the second IP core.

S1240. The gateway connected to the second IP core sends the first signal to the second IP core.

Optionally, in an embodiment of the present disclosure, the gateway connected to the first IP core determines, according to a correspondence between an IP core and a subnet, the subnet corresponding to the second IP core.

The gateway connected to the second IP core sends the first signal to the second IP core according to the correspondence between an IP core and a subnet.

Corresponding processes of the signal transmission method 1200 according to this embodiment of the present disclosure may be respectively implemented by all parts of the optical network-on-chip 100 in the foregoing embodiments of the present disclosure. For detailed descriptions, refer to the foregoing embodiments, and for brevity, details are not described herein again.

According to the signal transmission method in this embodiment of the present disclosure, communication resources required for each communication task are reduced, and network congestion is decreased, which may not only improve network transmission bandwidth, but also reserve a characteristic of efficient partial transmission of data, such that network performance can be improved.

It should be understood that specific examples in the present disclosure are intended merely to help a person skilled in the art better understand the embodiments of the present disclosure, but are not intended to limit the scope of the embodiments of the present disclosure.

It should also be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a specific process of the method described above, reference may be made to a corresponding description in the foregoing apparatus embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An optical network-on-chip, comprising:
N2 intellectual property (IP) cores;
N2/2 gateways; and
N2 optical routers;
wherein N is an even number;
wherein the N2 optical routers form two subnets, and every N2/2 optical routers form one subnet;
wherein each gateway in the N2/2 gateways is connected to two IP cores in the N2 IP cores, wherein IP cores connected to different gateways are different, and the two IP cores connected to each gateway are in one-to-one correspondences with the two subnets;
wherein the N2/2 gateways are in one-to-one correspondences with the N2/2 optical routers in each subnet in the two subnets, wherein each gateway is connected to an optical router that is in each subnet and that corresponds to each gateway;
wherein a first IP core in the N2 IP cores is configured to send a first signal to a gateway connected to the first IP core;
wherein the gateway connected to the first IP core is configured to:
determine a second IP core according to the first signal, wherein the second IP core is a destination IP core of the first signal; and
determine a subnet corresponding to the second IP core, and send the first signal to a first optical router in the subnet corresponding to the second IP core, wherein the first optical router is an optical router connected to the gateway that is connected to the first IP core;
wherein the subnet corresponding to the second IP core is configured to:
receive the first signal using the first optical router, and route the first signal to a second optical router in the subnet corresponding to the second IP core, wherein the second optical router is an optical router connected to a gateway that is connected to the second IP core; and
send, using the second optical router, the first signal to the gateway connected to the second IP core; and
wherein the gateway connected to the second IP core is configured to send the first signal to the second IP core.

2. The optical network-on-chip according to claim 1, wherein the gateway connected to the first IP core is configured to determine, according to a correspondence between an IP core and a subnet, the subnet corresponding to the second IP core; and
wherein the gateway connected to the second IP core is configured to send the first signal to the second IP core according to the correspondence between an IP core and a subnet.

3. The optical network-on-chip according to claim 1, wherein the N2 optical routers form the two subnets in the following manner:
arranging the N2 optical routers into N rows and N columns, wherein optical routers located in odd-numbered rows and odd-numbered columns and optical routers located in even-numbered rows and even-numbered columns belong to one subnet, and optical routers located in odd-numbered rows and even-numbered columns and optical routers located in even-numbered rows and odd-numbered columns belong to the other subnet; and
in each subnet, each optical router stretches out a pair of parallel waveguides respectively in four directions of upper left, lower left, upper right, and lower right, wherein the pair of parallel waveguides are connected to waveguides stretched out by another optical router, and when the waveguides arrive at an included angle between subnet edges, the waveguides continue extending in an opposite direction, and when the waveguides arrive at a subnet edge, the waveguides continue extending in a direction perpendicular to the edge.

4. The optical network-on-chip according to claim 3, wherein N2/2 optical routers in a same subnet in the two subnets have same Z coordinates, and optical routers in different subnets have different Z coordinates;
wherein X and Y coordinates of each optical router in each subnet are allocated in the following manner:

transforming each subnet to a Torus structure of N rows and N/2 columns, wherein optical routers in each column are in a longitudinal torus, and optical routers in an $i^{th}$ row and an $(i+N/2)^{th}$ row are in a transverse torus, wherein i=1,2, . . . , N/2; and successively allocating X and Y coordinates to each optical router in each subnet using an optical router located in an upper left corner as an origin of coordinates, a horizontally rightward direction as an X positive direction, and a vertically downward direction as a Y positive direction, and returning to the original structure according to an inverse process, so as to complete allocation of the coordinates;

each IP core in the two IP cores connected to each gateway and the optical router that is connected to each gateway and that is in the subnet corresponding to each IP core have same X, Y, and Z coordinates;

the gateway connected to the first IP core is configured to determine, according to Z coordinates of the second IP core, the subnet corresponding to the second IP core; and each optical router in each subnet uses the following routing algorithm:
  obtaining current node coordinates (Xc,Yc), and destination node coordinates (Xd,Yd);
    if Yc=Yd and Xc=Xd, an output direction is local;
    if Yc=Yd and Xc<Xd, an output direction is east;
    if Yc=Yd and XnXd, an output direction is west;
    if Yc≠Yd, |Yc−Yd|=N/2, and Xc<Xd, an output direction is west;
    if Yc≠Yd, |Yc−Yd|=N/2, and Yc≥Yd, an output direction is east;
    if Yc≠Yd, |Yc−Yd|≠N/2, and (Yt−Yc+N)% N>N/2, an output direction is north; or
    if Yc≠Yd, |Xc−Yd|≠N/2, and (Yt−Yc+N)% N≤N/2, an output direction is south, wherein (Xt,Yt) is determined in the following manner:
      if Yd<N/2, letting (Xt1,Yt1)=(Xc,Yd), and (Xt2,Yt2)=(Xc,Yd+N/2);
      otherwise, letting (Xt1,Yt1)=(Xc,Yd), and (Xt2,Yt2)=(Xc,Yd−N/2); and
      calculating Mint1=min(|Yt1−Yc|,N−|Yt1−Yc|), and Mint2=min(|Yt2−Yc|,N−|Yt2−Yc|);
      if Mint1<Mint2, (Xt,Yt)=(Xt1,Yt1); otherwise, (Xt,Yt)=(Xt2,Yt2).

5. The optical network-on-chip according to claim 3, wherein N2/2 optical routers in a same subnet in the two subnets have same Z coordinates, and optical routers in different subnets have different Z coordinates; and
  wherein X and Y coordinates of each optical router in each subnet are allocated in the following manner:
  transforming each subnet to a Torus structure of N/2 rows and N columns, wherein optical routers in each row are in a transverse torus, and optical routers in a $j^{th}$ column and a $(j+N/2)^{th}$ column are in a longitudinal torus, wherein j=1, 2, . . . , N/2; and successively allocating X and Y coordinates to each optical router in each subnet using an optical router located in an upper left corner as an origin of coordinates, a horizontally rightward direction as an X positive direction, and a vertically downward direction as a Y positive direction, and returning to the original structure according to an inverse process, so as to complete allocation of the coordinates;
  each IP core in the two IP cores connected to each gateway and the optical router that is connected to each gateway and that is in the subnet corresponding to each IP core have same X, Y, and Z coordinates;
  the gateway connected to the first IP core is configured to determine, according to Z coordinates of the second IP core, the subnet corresponding to the second IP core; and
  each optical router in each subnet uses the following routing algorithm:
    obtaining current node coordinates (Xc,Yc), and destination node coordinates (Xd,Yd);
      if Xc=Xd and Yc=Yd, an output direction is local;
      if Xc=Xd and Yc<Yd, an output direction is south;
      if Xc=Xd and Yc≥Yd, an output direction is north;
      if Xc≠Xd, |Xc−Xd|=N/2, and Yc<Yd, an output direction is north;
      if Xc≠Xd, |Xc−Xd|=N/2, and Yc≥Yd, an output direction is south;
      if Xc≠Xd, |Xc−Xd|≠N/2, and (Xt−Xc+N)% N>N/2, an output direction is west; or
      if Xc≠Xd, |Xc−Xd|≠N/2, and (Xt−Xc+N)% N≤N/2, an output direction is east, wherein (Xt,Yt) is determined in the following manner:
        if Xd<N/2, letting (Xt1,Yt1)=(Xd,Yc), and (Xt2,Yt2)=(Xd+N/2,Yc);
        otherwise, letting (Xt1,Yt1)=(Xd,Yc), and (Xt2,Yt2)=(Xd−N/2,Yc); and
        calculating Mint1=min(|xt1−Xc|,N−|Xt1−Xc|), and Mint2=min(|Xt2−Xc|,N−|Xt2−Xc|);
        if Mint1<Mint2, (Xt,Yt)=(Xt1,Yt1); otherwise, (Xt,Yt)=(Xt2,Yt2).

6. The optical network-on-chip according to claim 1, wherein each optical router in each subnet comprises:
  a first microring resonator, a second microring resonator, a third microring resonator, a fourth microring resonator, a fifth microring resonator, a sixth microring resonator, a seventh microring resonator, an eighth microring resonator, a ninth microring resonator, a tenth microring resonator, an eleventh microring resonator, and a twelfth microring resonator;
  a first waveguide, a second waveguide, a third waveguide, a fourth waveguide, a fifth waveguide, and a sixth waveguide;
  wherein one end of the first waveguide is a northern input end, and the other end is a southern output end;
  wherein one end of the second waveguide is a southern input end, and the other end is a northern output end;
  wherein one end of the third waveguide is a western input end, and the other end is an eastern output end;
  wherein one end of the fourth waveguide is an eastern input end, and the other end is a western output end;
  wherein one end of the fifth waveguide is a local input end; and
  wherein one end of the sixth waveguide is a local output end;
  wherein a signal that is input at the northern input end arrives at the local output end through the first waveguide, the first microring resonator, and the sixth waveguide;
  wherein a signal that is input at the southern input end arrives at the local output end through the second waveguide, the fourth microring resonator, and the sixth waveguide;
  wherein a signal that is input at the western input end arrives at the local output end through the third waveguide, the third microring resonator, and the sixth waveguide;

wherein a signal that is input at the eastern input end arrives at the local output end through the fourth waveguide, the second microring resonator, and the sixth waveguide;
wherein a signal that is input at the local input end arrives at the eastern output end through the fifth waveguide, the eighth microring resonator, and the third waveguide;
wherein the signal that is input at the local input end arrives at the western output end through the fifth waveguide, the fifth microring resonator, and the fourth waveguide;
wherein the signal that is input at the local input end (arrives at the southern output end through the fifth waveguide, the sixth microring resonator, and the first waveguide;
wherein the signal that is input at the local input end arrives at the northern output end through the fifth waveguide, the seventh microring resonator, and the second waveguide;
wherein the signal that is input at the northern input end arrives at the western output end through the first waveguide, the ninth microring resonator, and the fourth waveguide;
wherein the signal that is input at the northern input end arrives at the eastern output end through the first waveguide, the tenth microring resonator, and the third waveguide;
wherein the signal that is input at the southern input end arrives at the western output end through the second waveguide, the twelfth microring resonator, and the fourth waveguide; and
wherein the signal that is input at the southern input end (1021) arrives at the eastern output end through the second waveguide, the eleventh microring resonator, and the third waveguide.

7. The optical network-on-chip according to claim 1, wherein each subnet is a Torus topology.

8. The optical network-on-chip according to claim 7, wherein each optical router in each subnet uses an XY routing algorithm.

9. The optical network-on-chip according to claim 1, wherein each optical router in each subnet comprises:
a first microring resonator, a second microring resonator, a third microring resonator, a fourth microring resonator, a fifth microring resonator, a sixth microring resonator, a seventh microring resonator, and an eighth microring resonator;
a first waveguide, a second waveguide, a third waveguide, a fourth waveguide, a fifth waveguide, and a sixth waveguide;
wherein one end of the first waveguide is a northern input end, and the other end is a southern output end;
wherein one end of the second waveguide is a southern input end, and the other end is a northern output end;
wherein one end of the third waveguide is a western input end, and the other end is an eastern output end;
wherein one end of the fourth waveguide is an eastern input end, and the other end is a western output end;
wherein one end of the fifth waveguide is a local input end; and
wherein one end of the sixth waveguide is a local output end;
wherein a signal that is input at the northern input end arrives at the local output end through the first waveguide, the first microring resonator, and the sixth waveguide;
wherein a signal that is input at the southern input end arrives at the local output end through the second waveguide, the second microring resonator, and the sixth waveguide;
wherein a signal that is input at the western input end arrives at the local output end through the third waveguide, the eighth microring resonator , the first waveguide, the first microring resonator, and the sixth waveguide;
wherein a signal that is input at the eastern input end arrives at the local output end through the fourth waveguide, the fifth microring resonator, the second waveguide, the second microring resonator, and the sixth waveguide;
wherein a signal that is input at the local input end arrives at the eastern output end through the fifth waveguide, the fourth microring resonator, and the third waveguide;
wherein the signal that is input at the local input end arrives at the western output end through the fifth waveguide, the third microring resonator, and the fourth waveguide;
wherein the signal that is input at the local input end arrives at the southern output end through the fifth waveguide, the fourth microring resonator, the third waveguide, the eighth microring resonator, and the first waveguide;
wherein the signal that is input at the local input end arrives at the northern output end through the fifth waveguide, the third microring resonator, the fourth waveguide, the fifth microring resonator, and the second waveguide;
wherein the signal that is input at the eastern input end arrives at the northern output end through the fourth waveguide, the fifth microring resonator, and the second waveguide;
wherein the signal that is input at the eastern input end arrives at the southern output end through the fourth waveguide, the sixth microring resonator, and the first waveguide;
wherein the signal that is input at the western input end arrives at the northern output end through the third waveguide, the seventh microring resonator, and the second waveguide; and
wherein the signal that is input at the western input end arrives at the southern output end through the third waveguide, the eighth microring resonator, and the first waveguide.

10. The optical network-on-chip according to claim 1, wherein each optical router in each subnet is a Crux optical router.

11. An optical router, comprising:
a first microring resonator;
a second microring resonator;
a third microring resonator;
a fourth microring resonator;
a fifth microring resonator;
a sixth microring resonator;
a seventh microring resonator;
an eighth microring resonator;
a first waveguide;
a second waveguide;
a third waveguide;
a fourth waveguide;
a fifth waveguide; and
a sixth waveguide;

wherein one end of the first waveguide is a northern input end, and the other end is a southern output end;
wherein one end of the second waveguide is a southern input end, and the other end is a northern output end;
wherein one end of the third waveguide is a western input end, and the other end is an eastern output end;
wherein one end of the fourth waveguide is an eastern input end, and the other end is a western output end;
wherein one end of the fifth waveguide is a local input end;
wherein one end of the sixth waveguide is a local output end;
wherein a signal that is input at the northern input end arrives at the local output end through the first waveguide, the first microring resonator, and the sixth waveguide;
wherein a signal that is input at the southern input end arrives at the local output end through the second waveguide, the second microring resonator, and the sixth waveguide;
wherein a signal that is input at the western input end arrives at the local output end through the third waveguide, the eighth microring resonator, the first waveguide, the first microring resonator, and the sixth waveguide;
wherein a signal that is input at the eastern input end arrives at the local output end through the fourth waveguide, the fifth microring resonator, the second waveguide, the second microring resonator, and the sixth waveguide;
wherein a signal that is input at the local input end arrives at the eastern output end through the fifth waveguide, the fourth microring resonator, and the third waveguide;
wherein the signal that is input at the local input end arrives at the western output end through the fifth waveguide, the third microring resonator, and the fourth waveguide;
wherein the signal that is input at the local input end arrives at the southern output end through the fifth waveguide, the fourth microring resonator, the third waveguide, the eighth microring resonator, and the first waveguide;
wherein the signal that is input at the local input end arrives at the northern output end through the fifth waveguide, the third microring resonator, the fourth waveguide, the fifth microring resonator, and the second waveguide;
wherein the signal that is input at the eastern input end arrives at the northern output end through the fourth waveguide, the fifth microring resonator, and the second waveguide;
wherein the signal that is input at the eastern input end arrives at the southern output end through the fourth waveguide, the sixth microring resonator, and the first waveguide;
wherein the signal that is input at the western input end arrives at the northern output end through the third waveguide, the seventh microring resonator , and the second waveguide; and
wherein the signal that is input at the western input end arrives at the southern output end through the third waveguide, the eighth microring resonator , and the first waveguide.

12. An optical router, comprising:
a first microring resonator;
a second microring resonator;
a third microring resonator;
a fourth microring resonator;
a fifth microring resonator;
a sixth microring resonator;
a seventh microring resonator;
an eighth microring resonator;
a ninth microring resonator;
a tenth microring resonator;
an eleventh microring resonator; and
a twelfth microring resonator;
a first waveguide;
a second waveguide;
a third waveguide;
a fourth waveguide;
a fifth waveguide; and
a sixth waveguide;
wherein one end of the first waveguide is a northern input end, and the other end is a southern output end;
wherein one end of the second waveguide is a southern input end, and the other end is a northern output end;
wherein one end of the third waveguide is a western input end, and the other end is an eastern output end;
wherein one end of the fourth waveguide is an eastern input end, and the other end is a western output end;
wherein one end of the fifth waveguide is a local input end; and
wherein one end of the sixth waveguide is a local output end;
wherein a signal that is input at the northern input end arrives at the local output end through the first waveguide, the first microring resonator, and the sixth waveguide;
wherein a signal that is input at the southern input end arrives at the local output end through the second waveguide, the fourth microring resonator, and the sixth waveguide;
wherein a signal that is input at the western input end arrives at the local output end through the third waveguide, the third microring resonator, and the sixth waveguide;
wherein a signal that is input at the eastern input end arrives at the local output end through the fourth waveguide, the second microring resonator, and the sixth waveguide;
wherein a signal that is input at the local input end arrives at the eastern output end through the fifth waveguide, the eighth microring resonator, and the third waveguide;
wherein the signal that is input at the local input end arrives at the western output end through the fifth waveguide, the fifth microring resonator, and the fourth waveguide;
wherein the signal that is input at the local input end arrives at the southern output end through the fifth waveguide, the sixth microring resonator, and the first waveguide;
wherein the signal that is input at the local input end arrives at the northern output end through the fifth waveguide, the seventh microring resonator, and the second waveguide;
wherein the signal that is input at the northern input end arrives at the western output end through the first waveguide, the ninth microring resonator, and the fourth waveguide;

wherein the signal that is input at the northern input end arrives at the eastern output end through the first waveguide, the tenth microring resonator, and the third waveguide;

wherein the signal that is input at the southern input end arrives at the western output end through the second waveguide, the twelfth microring resonator, and the fourth waveguide; and wherein the signal that is input at the southern input end arrives at the eastern output end through the second waveguide, the eleventh microring resonator, and the third waveguide.

13. A method, comprising:

sending, by a first intellectual property (IP) core in N2 IP cores, a first signal to a gateway connected to the first IP core, wherein an optical network-on-chip comprises the N2 IP cores, N2/2 gateways, and N2 optical routers, wherein N is an even number, wherein the N2 optical routers form two subnets, and every N2/2 optical routers form one subnet, wherein each gateway in the N2/2 gateways is connected to every two IP cores in the N2 IP cores, wherein IP cores connected to different gateways are different, and the two IP cores connected to each gateway are in one-to-one correspondences with the two subnets, and wherein the N2/2 gateways are in one-to-one correspondences with the N2/2 optical routers in each subnet in the two subnets, wherein each gateway is connected to an optical router that is in each subnet and that is corresponding to each gateway;

determining, by the gateway connected to the first IP core, a second IP core according to the first signal, wherein the second IP core is a destination IP core of the first signal;

determining a subnet corresponding to the second IP core, and sending the first signal to a first optical router in the subnet corresponding to the second IP core, wherein the first optical router is an optical router connected to the gateway that is connected to the first IP core;

receiving, by the subnet corresponding to the second IP core, the first signal using the first optical router, and routing the first signal to a second optical router in the subnet corresponding to the second IP core, wherein the second optical router is an optical router connected to a gateway that is connected to the second IP core; and sending, using the second optical router, the first signal to the gateway connected to the second IP core; and sending, by the gateway connected to the second IP core, the first signal to the second IP core.

14. The method according to claim 13, wherein determining the subnet corresponding to the second IP core comprises determining, according to a correspondence between an IP core and a subnet, the subnet corresponding to the second IP core; and wherein sending, by the gateway connected to the second IP core, the first signal to the second IP core comprises sending, by the gateway connected to the second IP core, the first signal to the second IP core according to the correspondence between an IP core and a subnet.

15. The method according to claim 13, wherein the N2 optical routers form the two subnets in the following manner:

arranging the N2 optical routers into N rows and N columns, wherein optical routers located in odd-numbered rows and odd-numbered columns and optical routers located in even-numbered rows and even-numbered columns belong to one subnet, and optical routers located in odd-numbered rows and even-numbered columns and optical routers located in even-numbered rows and odd-numbered columns belong to the other subnet; and in each subnet, each optical router stretches out a pair of parallel waveguides respectively in four directions of upper left, lower left, upper right, and lower right, wherein the pair of parallel waveguides are connected to waveguides stretched out by another optical router, and if the waveguides arrive at an included angle between subnet edges, the waveguides continue extending in an opposite direction, if the waveguides arrive at a subnet edge, the waveguides continue extending in a direction perpendicular to the edge.

16. The method according to claim 15, wherein N2/2 optical routers in a same subnet in the two subnets have same Z coordinates, and optical routers in different subnets have different Z coordinates; and wherein X and Y coordinates of each optical router in each subnet are allocated in the following manner:

transforming each subnet to a Torus structure of N/2 rows and N columns, wherein optical routers in each row are in a transverse torus, and optical routers in a $j^{th}$ column and a $(j+N/2)^{th}$ column are in a longitudinal torus, wherein j=1, 2, . . . , N/2; and successively allocating X and Y coordinates to each optical router in each subnet using an optical router located in an upper left corner as an origin of coordinates, a horizontally rightward direction as an X positive direction, and a vertically downward direction as a Y positive direction, and returning to the original structure according to an inverse process, so as to complete allocation of the coordinates;

each IP core in the two IP cores connected to each gateway and the optical router that is connected to each gateway and that is in the subnet corresponding to each IP core have same X, Y, and Z coordinates;

the gateway connected to the first IP core determines, according to Z coordinates of the second IP core, the subnet corresponding to the second IP core; and each optical router in each subnet uses the following routing algorithm:

obtaining current node coordinates (Xc,Yc), and destination node coordinates (Xd,Yd);

if Xc=Xd and Yc=Yd, an output direction is local;

if Xc=Xd and Yc<Yd, an output direction is south;

if Xc=Xd and Yc≥Yd, an output direction is north;

if Xc≠Xd, |Xc−Xd|=N/2, and Yc<Yd, an output direction is north;

if Xc≠Xd, |Xc−Xd|=N/2, and Yc≥Yd, an output direction is south;

if Xc≠Xd, |Xc−Xd|≠N/2, and (Xt−Xc+N)% N>N/2, an output direction is west; or if Xc≠Xd, |Xc−Xd|≠N/2, and (Xt−Xc+N)% N≤N/2, an output direction is east, wherein (Xt,Yt) is determined in the following manner:

if Xd<N/2, letting (Xt1,Tt1)=(Xd,Yc), and (Xt2,Yt2)=(Xd+N/2,Yc);

otherwise, letting (Xt1,Yt1)=(Xd,Yc), and (Xt2,Yt2)=(Xd−N/2,Yc); and calculating Mint1=min(|Xt1−Xc|,N−|Xt1−Xc|), and Mint2=min(|Xt2−Xc|,N−|Xt2−if if Mint1<Mint2, (Xt,Yt)=(Xt1,Yt1); otherwise, (Xt,Yt)=(Xt2,Yt2).

17. The method according to claim 15, wherein: N2/2 optical routers in a same subnet in the two subnets have same Z coordinates, and optical routers in different subnets have different Z coordinates;

wherein X and Y coordinates of each optical router in each subnet are allocated in the following manner:

transforming each subnet to a Torus structure of N rows and N/2 columns, wherein optical routers in each column are in a longitudinal torus, and optical routers in an $i^{th}$ row and an $(i+N/2)^{th}$ row are in a transverse torus, wherein i=1,2, . . . , N/2; and successively allocating X and Y coordinates to each optical router in each subnet using an optical router located in an upper left corner as an origin of coordinates, a horizontally rightward direction as an X positive direction, and a vertically downward direction as a Y positive direction, and returning to the original structure according to an inverse process, so as to complete allocation of the coordinates;

each IP core in the two IP cores connected to each gateway and the optical router that is connected to each gateway and that is in the subnet corresponding to each IP core have same X, Y, and Z coordinates;

the gateway connected to the first IP core determines, according to Z coordinates of the second IP core, the subnet corresponding to the second IP core; and each optical router in each subnet uses the following routing algorithm:

obtaining current node coordinates (Xc,Yc), and destination node coordinates (Xd,Yd);

if Yc=Yd and Xc=Xd, an output direction is local;

if Yc=Yd and Xc<Xd, an output direction is east;

if Yc=Yd and XnXd, an output direction is west;

if Yc≠Yd, |Yc−Yd|=N/2, and Xc<Xd, an output direction is west;

if Yc≠Yd, |Yc−Yd|=N/2, and Yc≥Yd, an output direction is east;

if Yc≠Yd, |Yc−Yd|≠N/2, and (Yt−Yc+N)% N>N/2, an output direction is north; or if Yc≠Yd, |Xc−Yd|≠N/2, and (Yt−Yc+N)% N≤N/2, an output direction is south, wherein (Xt,Yt) is determined in the following manner:

if Yd<N/2, letting (Xt1,Yt1)=(Xc,Yd), and (Xt2,Yt2)=(Xc,Yd+N/2);

otherwise, letting (Xt1,Yt1)=(Xc,Yd), and (Xt2,Yt2)=(Xc,Yd−N/2); and calculating Mint1=min(|Yt1−Yc|,N−|Yt1−Yc|), and Mint2=min(|Yt2−Yc|,N−|Yt2−Yc|);

if Mint1<Mint2, (Xt,Yt)=(Xt1,Tt1); otherwise, (Xt,Yt)=(Xt2,Yt2).

18. The method according to claim 13, wherein each subnet is a Torus topology.

19. The method according to claim 18, wherein each optical router in each subnet uses an XY routing algorithm.

\* \* \* \* \*

UNITED STATES PATENT AND TRADEMARK OFFICE
CERTIFICATE OF CORRECTION

PATENT NO. : 10,250,958 B2
APPLICATION NO. : 15/625025
DATED : April 2, 2019
INVENTOR(S) : Ke Chen Page 1 of 1

It is certified that error appears in the above-identified patent and that said Letters Patent is hereby corrected as shown below:

In Column 24, Line 28, Claim 5, delete "calculating Mint1=min(|xt1-Xc|,N-|Xt1-Xc|)," and insert --calculating Mint1=min(|Xt1-Xc|,N-|Xt1-Xc|)--.

In Column 30, Line 56, Claim 16, delete "if Xd<N/2, letting (Xt1,Tt1)=(Xd,Yc)" and insert --if Xd<N/2, letting (Xt1,Yt1)=(Xd,Yc)--.

In Column 30, Line 61, Claim 16, delete "Mint2=min(|Xt2-Xc|,N-|Xt2-if" and insert --Mint2=min(|Xt2-Xc|,N-|Xt2-Xc|);--.

In Column 32, Line 3, Claim 17, delete "if Yc=Yd and XnXd" and insert --if Yc=Yd and Xc≥Xd--.

In Column 32, Line 19, Claim 17, delete "if Mint1<Mint2, (Xt,Yt)=(Xt1,Tt1)" and insert --if Mint1<Mint2, (Xt,Yt)=(Xt1,Yt1)--.

Signed and Sealed this
Sixth Day of August, 2019

Andrei Iancu
*Director of the United States Patent and Trademark Office*